US008660896B2

(12) United States Patent
Gupta et al.

(10) Patent No.: US 8,660,896 B2
(45) Date of Patent: Feb. 25, 2014

(54) SYSTEM FOR CREATING SEPARATE DATA SERVING SPACES FOR EACH MOBILE CARRIER IN A PLURALITY OF MOBILE CARRIERS

(75) Inventors: Arvind Gupta, San Carlos, CA (US); Kenta Umezu, Tokyo (JP); Sean P. Walker, Kent (GB); Ian B. Brayshaw, London (GB)

(73) Assignee: Yahoo! Inc., Sunnyvale, CA (US)

( * ) Notice: Subject to any disclaimer, the term of this patent is extended or adjusted under 35 U.S.C. 154(b) by 1265 days.

(21) Appl. No.: 11/830,230

(22) Filed: Jul. 30, 2007

(65) Prior Publication Data

US 2007/0270130 A1    Nov. 22, 2007

Related U.S. Application Data

(63) Continuation of application No. 11/712,276, filed on Feb. 28, 2007, now abandoned.

(60) Provisional application No. 60/779,840, filed on Mar. 6, 2006.

(51) Int. Cl.
*G06Q 30/00*    (2012.01)
*G06Q 30/02*    (2012.01)

(52) U.S. Cl.
CPC ................................. *G06Q 30/0256* (2013.01)
USPC ...................................................... 705/14.54

(58) Field of Classification Search
USPC ...................................................... 705/14.54
See application file for complete search history.

(56) References Cited

U.S. PATENT DOCUMENTS 6,009,409 A    12/1999   Adler et al. ...................... 705/14
6,026,368 A     2/2000   Brown et al. .................... 705/14

(Continued)

FOREIGN PATENT DOCUMENTS

JP      1996-172495 A    7/1996
JP          8172495        7/1996

(Continued)

OTHER PUBLICATIONS

"CTIA: Smaato Introduces New Mobile Ad Solutions for Carriers: Advertising Delivery Support for Java Phones, Smartphones & Mobile Web; Launch of New Version of Soma Mobile Advertising Platform," CTIA—San Francisco Moscone Center, Booth # 108, Oct. 23-25, 2007, 2 pages. Retrieved from http://www.smaato.com/download/pressarea/Smaato_CTIA_20071022_release.pdf.

(Continued)

*Primary Examiner* — James W Myhre
(74) *Attorney, Agent, or Firm* — Brinks Gilson & Lione

(57) ABSTRACT

A system is described for creating a separate data serving space for each mobile carrier in a plurality of mobile carriers. The system may include a processor, a memory and an interface. The memory may store a keyword, a plurality of mobile data items corresponding to the keyword and a plurality of mobile carriers, and a search request. The interface may communicate with a user through a mobile device. The processor may be operatively connected to the interface and the memory and may store the plurality of mobile data items in the memory. The processor may receive a mobile search request from a user via the interface, and may determine the mobile carrier in communication with the interface. The processor may then retrieve the mobile data item corresponding to the keyword and the determined mobile carrier and may serve the retrieved mobile data item to the user.

12 Claims, 19 Drawing Sheets

(56) References Cited

U.S. PATENT DOCUMENTS

| | | | |
|---|---|---|---|
| 6,047,310 A | 4/2000 | Kamakura et al. | |
| 6,199,045 B1 | 3/2001 | Giniger et al. | 705/1 |
| 6,205,193 B1 | 3/2001 | Solve et al. | |
| 6,298,330 B1 | 10/2001 | Gardenswartz et al. | |
| 6,334,108 B1 | 12/2001 | Deaton et al. | |
| 6,343,317 B1 | 1/2002 | Glorikian | 709/217 |
| 6,377,793 B1 | 4/2002 | Jenkins | 455/456 |
| 6,381,465 B1 | 4/2002 | Chern et al. | |
| 6,401,075 B1 | 6/2002 | Mason et al. | 705/14 |
| 6,480,713 B2 | 11/2002 | Jenkins | 455/456 |
| 6,510,515 B1 | 1/2003 | Raith | |
| 6,654,725 B1 | 11/2003 | Langheinrich et al. | 705/14 |
| 6,681,107 B2 | 1/2004 | Jenkins et al. | 455/412.1 |
| 6,714,975 B1 | 3/2004 | Aggarwal et al. | 709/224 |
| 6,795,710 B1* | 9/2004 | Creemer | 455/456.3 |
| 6,822,663 B2 | 11/2004 | Wang et al. | |
| 6,826,572 B2 | 11/2004 | Colace et al. | 707/10 |
| 6,907,566 B1 | 6/2005 | McElfresh et al. | 715/517 |
| 6,928,615 B1 | 8/2005 | Haitsuka et al. | 345/340 |
| 6,985,742 B1 | 1/2006 | Giniger et al. | 455/414.3 |
| 7,043,483 B2 | 5/2006 | Colace et al. | 707/3 |
| 7,120,235 B2 | 10/2006 | Altberg et al. | |
| 7,136,661 B2 | 11/2006 | Graske et al. | |
| 7,200,853 B2 | 4/2007 | Kawai | |
| 7,277,718 B2 | 10/2007 | Wong | |
| 7,283,974 B2 | 10/2007 | Katz et al. | |
| 7,363,024 B2 | 4/2008 | Jenkins | 455/412.1 |
| 7,487,112 B2 | 2/2009 | Barnes, Jr. | |
| 7,593,721 B2* | 9/2009 | Ratnakar | 455/414.2 |
| 7,606,918 B2 | 10/2009 | Holzman et al. | |
| 7,657,520 B2 | 2/2010 | Chen et al. | |
| 7,660,581 B2 | 2/2010 | Ramer et al. | |
| 7,729,945 B1* | 6/2010 | Katz et al. | 705/26 |
| 7,801,892 B2 | 9/2010 | Lee et al. | |
| 2002/0010759 A1 | 1/2002 | Hitson et al. | |
| 2002/0046259 A1 | 4/2002 | Glorikian | 709/203 |
| 2002/0073034 A1 | 6/2002 | Wagner et al. | 705/51 |
| 2002/0077897 A1* | 6/2002 | Zellner et al. | 705/14 |
| 2002/0078101 A1 | 6/2002 | Chang et al. | 707/523 |
| 2002/0083441 A1 | 6/2002 | Flickinger et al. | |
| 2002/0083442 A1 | 6/2002 | Eldering | |
| 2002/0128908 A1 | 9/2002 | Levin et al. | |
| 2002/0129137 A1 | 9/2002 | Mills et al. | |
| 2002/0161791 A1 | 10/2002 | Hanhikoski | |
| 2002/0164004 A1 | 11/2002 | Tamura et al. | |
| 2003/0046161 A1 | 3/2003 | Kamangar et al. | 705/14 |
| 2003/0055725 A1 | 3/2003 | Lee | |
| 2003/0149938 A1 | 8/2003 | McElfresh et al. | 715/517 |
| 2003/0154446 A1 | 8/2003 | Constant et al. | |
| 2004/0039733 A1 | 2/2004 | Soulanille | 707/3 |
| 2004/0044571 A1 | 3/2004 | Bronnimann et al. | |
| 2004/0054576 A1 | 3/2004 | Kanerva et al. | 709/206 |
| 2004/0088212 A1 | 5/2004 | Hill | |
| 2004/0093327 A1 | 5/2004 | Anderson et al. | 707/1 |
| 2004/0186776 A1 | 9/2004 | Llach | 709/200 |
| 2004/0194130 A1 | 9/2004 | Konig et al. | |
| 2005/0010477 A1 | 1/2005 | Sullivan et al. | 705/10 |
| 2005/0154746 A1 | 7/2005 | Liu et al. | 707/5 |
| 2005/0174975 A1 | 8/2005 | Mgrdechian et al. | 370/338 |
| 2005/0228797 A1 | 10/2005 | Koningstein et al. | |
| 2005/0289113 A1 | 12/2005 | Bookstaff | |
| 2006/0026069 A1 | 2/2006 | Mazurkiewicz et al. | |
| 2006/0041638 A1 | 2/2006 | Whittaker et al. | |
| 2006/0085419 A1 | 4/2006 | Rosen et al. | 705/1 |
| 2006/0100928 A1 | 5/2006 | Walczak, Jr. et al. | |
| 2006/0116926 A1 | 6/2006 | Chen | |
| 2006/0149630 A1 | 7/2006 | Elliott et al. | 705/14 |
| 2006/0172697 A1 | 8/2006 | Gallego et al. | 455/522 |
| 2006/0184512 A1 | 8/2006 | Kohanim et al. | |
| 2006/0194572 A1 | 8/2006 | Fresonke et al. | 455/414.1 |
| 2006/0194595 A1 | 8/2006 | Myllynen et al. | 455/412.2 |
| 2006/0242013 A1 | 10/2006 | Agarwal et al. | |
| 2006/0271524 A1 | 11/2006 | Tanne et al. | |
| 2006/0282408 A1 | 12/2006 | Wisely et al. | |
| 2006/0288000 A1 | 12/2006 | Gupta | |
| 2007/0018952 A1 | 1/2007 | Arseneau et al. | |
| 2007/0027852 A1 | 2/2007 | Howard et al. | |
| 2007/0042754 A1 | 2/2007 | Bajikar et al. | |
| 2007/0061334 A1 | 3/2007 | Ramer et al. | |
| 2007/0088801 A1 | 4/2007 | Levkovitz et al. | |
| 2007/0112739 A1 | 5/2007 | Burns et al. | |
| 2007/0121846 A1 | 5/2007 | Altberg et al. | |
| 2007/0174258 A1 | 7/2007 | Jones et al. | |
| 2007/0174490 A1 | 7/2007 | Choi et al. | 709/246 |
| 2007/0192318 A1 | 8/2007 | Ramer et al. | |
| 2007/0198339 A1 | 8/2007 | Shen et al. | |
| 2007/0213069 A1 | 9/2007 | Ji et al. | |
| 2007/0214043 A1 | 9/2007 | Yasuda | |
| 2007/0214048 A1 | 9/2007 | Chan et al. | |
| 2007/0233565 A1 | 10/2007 | Herzog et al. | |
| 2007/0233566 A1 | 10/2007 | Zlotin et al. | |
| 2007/0264987 A1 | 11/2007 | Gupta et al. | |
| 2007/0288318 A1 | 12/2007 | Gupta et al. | |
| 2007/0294725 A1 | 12/2007 | Cohen et al. | |
| 2008/0032703 A1 | 2/2008 | Krumm et al. | |
| 2008/0221983 A1 | 9/2008 | Ausiannik et al. | |
| 2008/0256050 A1 | 10/2008 | Zhang et al. | |
| 2009/0049090 A1 | 2/2009 | Shenfield et al. | |

FOREIGN PATENT DOCUMENTS

| | | |
|---|---|---|
| JP | 2004-038367 A | 2/2004 |
| KR | 10-2000-0036964 A | 7/2000 |
| KR | 10-2001-0090958 A | 10/2001 |
| KR | 10-2001-0097071 A | 11/2001 |
| KR | 10-2001-0102668 A | 11/2001 |
| KR | 10-2002-0000289 A | 1/2002 |
| KR | 10-2002-0065806 A | 8/2002 |
| KR | 2003-0026446 A | 4/2003 |
| KR | 10-2004-0099223 A | 11/2004 |
| KR | 10-2005-0097155 A | 10/2005 |
| KR | 2006-0004579 A | 1/2006 |
| KR | 2006-0028515 A | 3/2006 |
| KR | 2006-0062360 A | 6/2006 |
| KR | 10-2006-0127318 A | 12/2006 |
| KR | 10-0757757 B1 | 9/2007 |

OTHER PUBLICATIONS

"Strong Partners for Effective Mobile Advertising: Adconion Media Group and Smaato Enter Strategic Partnership," San Mateo / Munich, Germany—May 9, 2007, 2 pages. Retrieved from http://www.smaato.com/download/pressarea/Smaato_AMD_20070503_release.pdf.

"Smaato—Media / Developers," pp. 1-2, http://www.smaato.com/mo_mediadev.php, available at least as of Jan. 3, 2008.

"Smaato—Mobile Carriers," pp. 1-2, http://www.smaato.com/mo_carriers.php, available as least as of Jan. 3, 2008.

"Smaato—Mobile Marketing," pp. 1-2, http://www.smaato.com/mobile.php, available at least as of Jan. 3, 2008.

"ESME," *Wikipedia, the free encyclopedia*, p. 1, http://en.wikipedia.org/wiki/ESME, last modified Dec. 20, 2006, last visited Oct. 9, 2007.

"Network Switching Subsystem," *Wikipedia, the free encyclopedia*, pp. 1-6, http://en.wikipedia.org/wiki/Network_Switching_Subsystem, last modified Oct. 9 2007, last visited Oct. 9, 2007.

"Short message service," *Wikipedia, the free encyclopedia*, pp. 1-5, http://en.wikipedia.org/wiki/Short_message_service, last modified Oct. 9, 2007, last visited Oct. 9, 2007.

"Short message service center," *Wikipedia, the free encyclopedia*, pp. 1-2, http://en.wikipedia.org/wiki/Short_message_service_center, last modified Sep. 11, 2007, last visited Oct. 9, 2007.

"Signal Transfer Point," *Wikipedia, the free encyclopedia*, p. 1, http://en.wikipedia.org/wiki/Signal_transfer_point, last modified Aug. 16, 2007, last visited Oct. 9, 2007.

"My First 6 Yahoo Panama 'Enhancement' Requests [Archive]", *Search Engine Watch Forums*, pp. 1-2, http://forums.searchenginewatch.com/archive/index.php/t-15882.html, containing posts from Jan. 18, 2007 to Jan. 25, 2007, last visited Apr. 23, 2008.

(56) References Cited

OTHER PUBLICATIONS

"Limbo Offers Purina Pet Lodown," *Adweek*, pp. 1-2, http://www.adweek.com/aw/iq_interactive/article_display.jsp?vnu_content_id=1003665626, dated Oct. 31, 2007, last visited Apr. 1, 2008.
Japanese Blog, printed from the internet at <http://halhal777.blog3.fc2.com/blog-entry-94.html> on Apr. 24, 2009, 12 pages.
Japanese Blog, printed from the internet at <http://k.hatena.ne.jp/keywordblog/jmobi> on Apr. 24, 2009, 3 pages.
Japanese Blog, printed from the internet at <http://blog.livedoor.jp/junpaku/archives/16328274.html on Apr. 24, 2009, 4 pages.
Japanese Blog, printed from the internet at <http://netanetaneta.seesaa.net/> on Apr. 24, 2009, 10 pages.
Japanese Blog, printed from the internet at <http://www.rc-seo.jp/000027.html> on Apr. 24, 2009, 2 pages.
Japanese Blog, printed from the internet at <http://www.cottonwool.jp/labo/jmobi.html> on Apr. 24, 2009, 3 pages.
Japanese Blog, printed from the internet at <http://www.googleadsense.seesaa.net/article/2238902.html> on Apr. 24, 2009, 3 pages.
Japanese Blog, printed from the internet at <http://vanillachips.net/archives/20050309_2336.php> on Apr. 24, 2009, 4 pages.
"Internet White Paper 2006," *Internet White Paper*, R&D, Tokyo, Japan, Jun. 21 2006, 15 pages.
International Search Report and Written Opinion dated Aug. 16, 2007 for corresponding PCT Application No. PCT/US2007/005217, 9 pages.
International Search Report and Written Opinion of the International Searching Authority dated Jul. 27, 2009 for corresponding International Application No. PCT/US2009/030196, 7 pages.
International Search Report and Written Opinion of the International Searching Authority dated Jul. 31, 2009 for corresponding International Application No. PCT/US2009/035657, 7 pages.
International Search Report and Written Opinion of the International Searching Authority dated Aug. 31, 2009 for corresponding International Application No. PCT/US2009/035662, 9 pages.
International Search Report and Written Opinion of the International Searching Authority dated Feb. 17, 2010 for corresponding International Application No. PCT/US2009/049227, 8 pages.
International Search Report and Written Opinion of the International Searching Authority dated Feb. 18, 2009 for corresponding International Application No. PCT/US2008/067099, 7 pages.
International Search Report and Written Opinion of the International Searching Authority dated Jun. 30, 2009 for corresponding International Application No. PCT/US2008/084163, 7 pages.
International Search Report and Written Opinion of the International Searching Authority dated Jun. 24, 2009 for corresponding International Application No. PCT/US2008/084172, 7 pages.
International Search Report and Written Opinion of the International Searching Authority dated Jun. 24, 2009 for corresponding International Application No. PCT/US2008/084338, 8 pages.
International Preliminary Report on Patentability dated Sep. 9, 2008 for corresponding International Application No. PCT/US2007/005217, 6 pages.
International Preliminary Report on Patentability dated Jan. 12, 2010 for corresponding International Application No. PCT/US2008/067099, 5 pages.
International Preliminary Report on Patentability dated Jun. 22, 2010 for corresponding International Application No. PCT/US2008/084163, 5 pages.
International Preliminary Report on Patentability dated Jun. 22, 2010 for corresponding International Application No. PCT/US2008/084172, 5 pages.
International Preliminary Report on Patentability dated Jun. 22, 2010 for corresponding International Application No. PCT/US2008/084338, 6 pages.
STIC Search Report EIC 3600 dated Feb. 5, 2010; for U.S. Appl. No. 11/830,194, 86 pages.
Advisory Action mailed Aug. 3, 2010 for U.S. Appl. No. 11/712,276, 3 pages.
Supplemental Final Office Action mailed Apr. 30, 2010 for U.S. Appl. No. 11/712,276, 15 pages.
Final Office Action mailed Mar. 5, 2010 for U.S. Appl. No. 11/712,276, 13 pages.
Office Action mailed Sep. 10, 2009 for U.S. Appl. No. 11/712,276, 12 pages.
Final Office Action mailed Aug. 23, 2010 for U.S. Appl. No. 11/776,073, 17 pages.
Office Action mailed Apr. 30, 2010 for U.S. Appl. No. 11/776,073, 14 pages.
Office Action mailed Dec. 29, 2009 for U.S. Appl. No. 11/776,073, 13 pages.
Advisory Action mailed Aug. 10, 2010 for U.S. Appl. No. 11/776,081, 3 pages.
Final Office Action mailed Apr. 29, 2010 for U.S. Appl. No. 11/776,081, 13 pages.
Office Action mailed Dec. 22, 2009 for U.S. Appl. No. 11/776,081, 9 pages.
Notice of Allowance mailed Feb. 17, 2010 for U.S. Appl. No. 11/830,194, 12 pages.
Office Action mailed Sep. 4, 2009 for U.S. Appl. No. 11/830,194, 14 pages.
Advisory Action mailed May 3, 2010 for U.S. Appl. No. 11/830,344, 3 pages.
Final Office Action mailed Feb. 24, 2010 for U.S. Appl. No. 11/830,344, 15 pages.
Office Action mailed Sep. 11, 2009 for U.S. Appl. No. 11/830,344, 15 pages.
Advisory Action mailed May 27, 2010 for U.S. Appl. No. 11/830,406, 3 pages.
Final Office Action mailed Mar. 23, 2010 for U.S. Appl. No. 11/830,406, 14 pages.
Office Action mailed Sep. 14, 2009 for U.S. Appl. No. 11/830,406, 15 pages.
Examiner's Answer to Appeal Brief mailed Aug. 4, 2010 for U.S. Appl. No. 11/830,431, 11 pages.
Advisory Action mailed Apr. 16, 2010 for U.S. Appl. No. 11/830,431, 3 pages.
Final Office Action mailed Feb. 12, 2010 for U.S. Appl. No. 11/830,431, 11 pages.
Office Action mailed Sep. 9, 2009 for U.S. Appl. No. 11/830,431, 11 pages.
Office Action mailed Jun. 10, 2010 for U.S. Appl. No. 11/963,154, 11 pages.
Office Action mailed May 4, 2010 for U.S. Appl. No. 12/165,175, 21 pages.
Office Action mailed Aug. 20, 2010 for U.S. Appl. No. 12/026,522, 18 pages.
Examiner's Answer to Appeal Brief mailed Aug. 30, 2010 for U.S. Appl. No. 11/830,344, 16 pages.
Examiner's Answer to Appeal Brief mailed Oct. 21, 2010 for U.S. Appl. No. 11/830,406, 22 pages.
Final Office Action mailed Nov. 23, 2010 for U.S. Appl. No. 11/963,154, 19 pages.
Final Office Action mailed Sep. 7, 2010 for U.S. Appl. No. 12/165,175, 18 pages.
International Preliminary Report on Patentability dated Aug. 10, 2010 for corresponding International Application No. PCT/US2009/030196, 6 pages.
International Preliminary Report on Patentability dated Oct. 5, 2010 for corresponding International Application No. PCT/US2009/035657, 6 pages.
International Preliminary Report on Patentability dated Oct. 5, 2010 for corresponding International Application No. PCT/US2009/035662, 8 pages.
Notice of Allowance mailed Oct. 21, 2010 for U.S. Appl. No. 11/830,194, 9 pages.
Office Action dated Jul. 28, 2010 for corresponding Korean Application No. 10-2008-7021632, 11 pages.
Office Action mailed Dec. 10, 2010 for U.S. Appl. No. 11/963,082, 13 pages.
Office Action mailed Dec. 20, 2010 for U.S. Appl. No. 12/059,460, 10 pages.

(56) References Cited

OTHER PUBLICATIONS

Office Action mailed Nov. 3, 2010 for U.S. Appl. No. 11/830,307, 17 pages.
Office Action mailed Oct. 20, 2010 for U.S. Appl. No. 11/963,029, 14 pages.
Advisory Action mailed Feb. 14, 2011 for U.S. Appl. No. 11/963,154, 3 pages.
Examiner's Answer to Appeal Brief mailed Jan. 18, 2010 for U.S. Appl. No. 11/712,276, 16 pages.
International Preliminary Report on Patentability dated Feb. 1, 2011 for corresponding International Application No. PCT/US2009/049227, 7 pages.
Office Action mailed Jan. 21, 2011 for U.S. Appl. No. 12/180,782, 11 pages.
Office Action mailed Feb. 16, 2011 for U.S. Appl. No. 12/059,421, 12 pages.
Final Office Action mailed Feb. 3, 2011 for U.S. Appl. No. 11/963,029, 13 pages.
Final Office Action mailed Feb. 16, 2011 for U.S. Appl. No. 11/830,307, 17 pages.
Final Office Action mailed Feb. 17, 2011 for U.S. Appl. No. 12/026,522, 23 pages.
Final Office Action mailed Apr. 13, 2011 for U.S. Appl. No. 11/963,082, 13 pages.
AT&T Acquires Ingenio and Their Pay-Per-Call Network, Nov. 19, 2007, retrieved from the internet on Sep. 9, 2012, 2 pages.
CrunchBase: Ingenio, Jun. 27, 2012, retrieved from the Internet on Sep. 9, 2012, 4 pages.
Ingenio Pay Per Call Advertising, undated, retrieved from the Internet on Sep. 9, 2012, 2 pages.

* cited by examiner

SYSTEM FOR CREATING SEPARATE DATA SERVING SPACES FOR EACH MOBILE CARRIER IN A PLURALITY OF MOBILE CARRIERS

CROSS-REFERENCE TO RELATED APPLICATIONS

This application is a continuation of U.S. patent application Ser. No. 11/712,276, filed on Feb. 28, 2007, which claims the benefit of U.S. Provisional Application No. 60/779,840, filed on Mar. 6, 2006, both of which are incorporated by reference herein.

TECHNICAL FIELD

The present description relates generally to a system and method, generally referred to as a system, for creating separate data serving spaces for each mobile carrier in a plurality of mobile carriers, and more particularly, but not exclusively, to creating separate mobile advertisement serving spaces for each mobile carrier in a plurality of mobile carriers.

BACKGROUND

The mobile phone may be increasingly important as an information and content access device. Currently there may be over 2 billion mobile phones globally, versus 800 million personal computers. Mobile operators may be increasingly looking to high value data services as a way to overcome the continuing voice revenue decline. Billions of dollars may be being spent globally on wireless licenses with billions more in investments in the pipeline for development of infrastructure and services by wireless service and content providers. Carriers may be introducing new data, content and multimedia services as a means of generating new revenue stream, reversing negative revenue trends, retaining and attracting customers as well as increasing returns on investment, and extending and differentiating their service offering to consumers. The emergence of these wireless technologies may be creating unique opportunities for wireless carriers, advertisers and publishers to generate additional revenue streams through new and existing customers. As consumer adoption of wireless technology continues to increase, marketing via mobile devices may become an important part of all integrated data communications strategies.

Mobile marketing may benefit consumers, mobile service providers, publishers and advertisers by driving incremental revenue, enhancing consumer loyalty and providing convenience for mobile consumers. Mobile data acceptance may have arrived in many parts of the World and may be expected to increase. Mobile destination portals such as YAHOO! may monetize the mobile searches.

The global business model of mobile marketing to date may depend upon subscription revenue and purchases of consumables (i.e. ring tones, wallpapers, etc.). Slow roll-out and relatively small incremental revenue streams may be jeopardizing return on investment on current and future investments. Wireless advertising may now be seen as the great hope in accelerating revenue growth, especially given the experience of online web advertising. Search may be emerging as both a key feature and a potential universal interface for discovering and accessing mobile information.

However, usage patterns for mobile search and Web search may differ, as well as the expectations of the users and the advertisers. Combined with a completely different user experience, these may change the value of clicks and lead opportunities. Most current mobile devices may have limited browser capabilities that do not support the rich feature set of the Web. Handset capabilities may impact the search behavior of mobile users, where the limitations of numeric-pad keyed entry narrow the searched for terms. The small screen size on mobile devices may have an impact on the performance of the search implementations. The size of screens on mobile handsets may limit the creative that can be displayed per listing, and the number of listings per screen. Current web search marketing systems may not account for these physical differences between mobile handsets and computers.

The mobile marketplace may be very fragmented in terms of handset and network technologies, and this may impact the display of listings and advertiser offer sites. For mobile devices, there may not be an HTML-like standard adhered to by all carriers, and the "standards" that are present may tend to be operator specific, and may be incompatible with other "standards". This may lead to markets within markets, where, for example in Japan, advertisers may create separate sites and campaigns for IMODE users, and XHTML and WML users. This fragmentation may also be barrier to entry for advertisers due to the investment required to support the different technologies and interact with each individual carrier. Advertisers may be faced with either a large start-up investment, or foregoing traffic from certain operators.

SUMMARY

A system is disclosed for creating separate data serving space for each mobile carrier in a plurality of mobile carriers. The system may include a processor, a memory and an interface. The memory may be operatively connected to the processor and the interface and may store a keyword, a plurality of mobile data items, wherein each mobile data item corresponds to the keyword and a mobile carrier, and a mobile search request. The interface may be operatively connected to the memory, and the processor, and may communicate with a user though a mobile device of a mobile carrier. The processor may be operatively connected to the interface and the memory, and may store the plurality of mobile data items in the memory. The processor may receive a mobile search request for the keyword from a user via the interface. The processor may determine which mobile carrier of the mobile device with and the processor may retrieve the mobile data item corresponding to the keyword and the determined mobile carrier. The processor may serve the retrieved mobile data item to the user via the interface.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 17 is a screenshot of a revenue generator's add money confirmation screen in the systems of FIG. 1, FIG. 2, and FIG. 3, or other systems for creating separate data serving spaces for each mobile carrier in a plurality of mobile carriers.

FIG. 18 is a screenshot of a revenue generator's add payment method in the systems of FIG. 1, FIG. 2, and FIG. 3, or other systems for creating separate data serving spaces for each mobile carrier in a plurality of mobile carriers.

DETAILED DESCRIPTION

A system and method, generally referred to as a system, may relate to creating separate data serving spaces for each mobile carrier in a plurality of mobile carriers, and more particularly, but not exclusively, to creating separate mobile advertisement serving spaces for each mobile carrier in a plurality of mobile carriers. The principles described herein may be embodied in many different forms.

Figure 1:
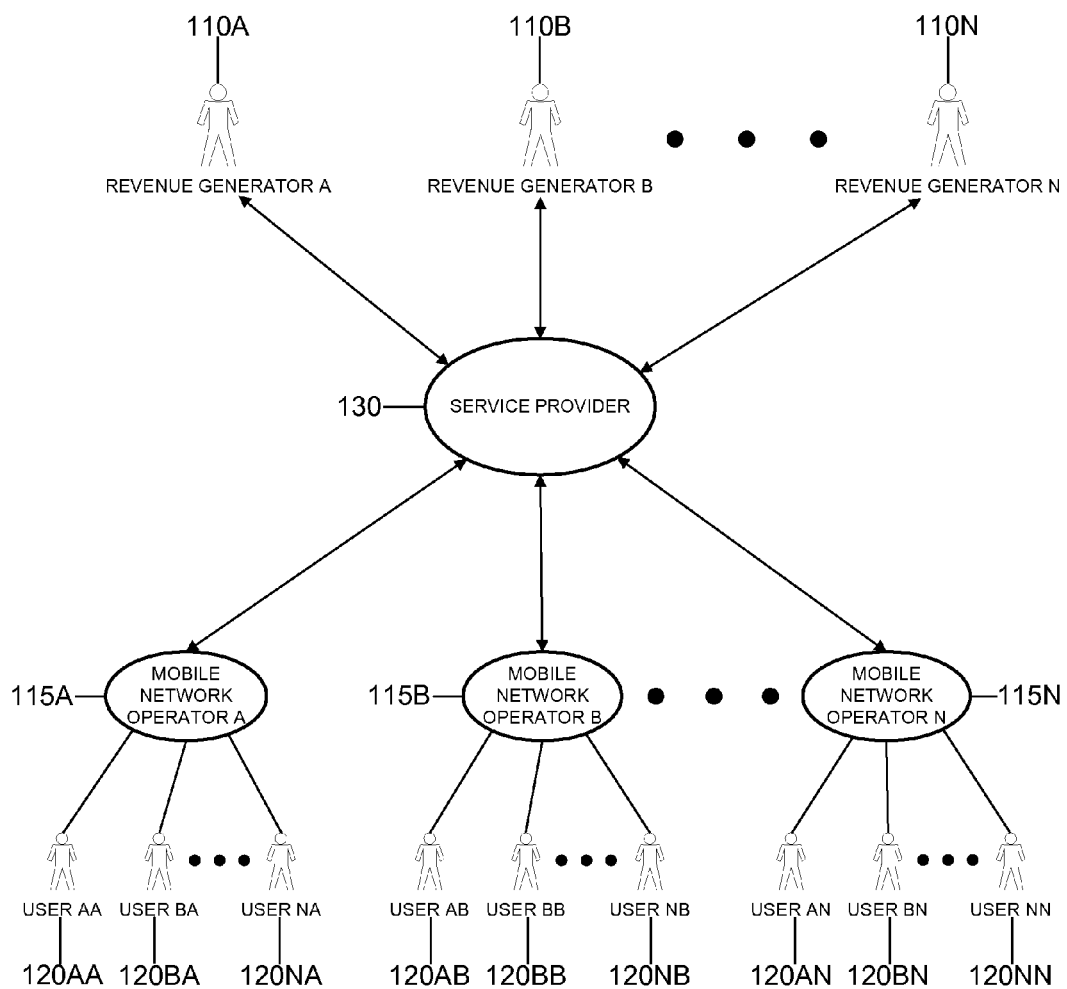
FIG. 1 is a block diagram of a general overview of a system for creating separate data serving spaces for each mobile carrier in a plurality of mobile carriers.

FIG. 1 provides a general overview of a system 100 for creating separate data serving spaces for each mobile carrier in a plurality of mobile carriers. Not all of the depicted components may be required, however, and some implementations may include additional components. Variations in the arrangement and type of the components may be made without departing from the spirit or scope of the claims as set forth herein. Additional, different or fewer components may be provided.

The system 100 may include one or more revenue generators 110A-N, such as mobile advertisers, a service provider 130, such as a portal, one or more mobile network operators ("MNOs") 115A-N, more commonly referred to as mobile carriers or simply carriers, and one or more users 120AA-NN, such as mobile subscribers or consumers. The revenue generators 110A-N may pay the service provider 130 to display advertisements, such as on-line advertisements on a network such as a mobile network or the Internet. The payments may be based on various factors, such as the number of times an advertisement may be displayed to the users 120AA-NN and/or the number of times one of the users 120AA-NN may click through the advertisement to the revenue generator's web site or mobile site.

The service provider 130 may maintain a mobile site or mobile portal, such as a search site, where the service provider 130 may display advertisements of the revenue generators 110A-N to the users 120AA-NN. The service provider 130 may share revenue with the MNOs 115A-N for displaying advertisements of the revenue generators 110A-N on their mobile networks. Alternatively or in addition the service provider 130 may share revenue with individual mobile publishers for displaying advertisements of the revenue generators 110A-N on their mobile sites.

The users 120AA-NN may be consumers of goods or services who may be searching for a business such as the business of one of the revenue generators 110A-N. The users 120AA-NN may communicate with the service provider 130 through the mobile network operators 115A-N. The users 120AA-NN may supply information describing themselves to the service provider 130, such as the location, gender, or age of the users 120AA-NN, or generally any information that may be required for the users 120AA-NN to utilize the services provided by the service provider 130. Alternatively or in addition the service provider 130 may obtain information about the users 120AA-NN from the MNOs 115A-N.

In the system 100, the revenue generators 110A-N may interact with the service provider 130, such as via a web application. The revenue generators 110A-N may send information, such as billing, website or mobile site and advertisement information, to the service provider 130 via the web application. The web application may include a web browser or other application such as any application capable of displaying web content. The application may be implemented with a processor such as a personal computer, personal digital assistant, mobile phone, or any other machine capable of implementing a web application.

The users 120AA-NN may also interact individually with the service provider 130, through the mobile network operators 115A-N, such as via a mobile phone or any device capable of communicating with the mobile network operators 115A-N. The users 120AA-NN may interact with the service provider 130 via a mobile web based application, a mobile standalone application, or any application capable of running on a mobile device. The service provider 130 may communicate data to the revenue generators 110A-N over a network and to the users 120AA-NN over a network via the MNOs 115A-N. The following examples may refer to a revenue generator A 110A as an online advertiser or mobile advertiser; however the system 100 may apply to any revenue generators 110A-N who may desire to serve advertisements over mobile devices.

In operation, one of the revenue generators 110A-N, such as revenue generator A 110A, may provide information to the service provider 130. This information may relate to the transaction taking place between the revenue generator A 110A and the service provider 130, or may relate to an account the revenue A 110A generator maintains with the service provider 130. In the case of a revenue generator A 110A who is a mobile advertiser, the revenue generator A 110A may provide initial information necessary to open an account with the service provider 130.

A revenue generator A 110A who is an mobile advertiser may maintain one or more accounts with the service provider 130. For each account the revenue generator A 110A may maintain one or more campaigns. For each campaign the revenue generator A 110A may maintain one or more listings. A listing may include a search keyword and one or more carrier listings. Each carrier listing may identify the mobile carrier and may include an advertisement title, an advertisement description, a bid amount and a mobile site URL, if any. A carrier listing may represent an association between a search keyword, a mobile advertisement and a carrier whose users are targeted by the mobile advertisement.

The carrier listings may allow the service provider 130 to provide a mobile advertising marketplace separate from the web advertising marketplace, essentially separating the web keywords from the mobile keywords. The carrier listings may also allow the service provider 130 to provide a separate marketplace for each of the MNOs 115A-N, essentially separating the keywords associated with each of the MNOs 115A-N. For example, the revenue generator A 110A may place one bid on the keyword "dvd" for the MNO A 115A and a separate bid for the keyword "dvd" for the MNO B 115B. Furthermore, by creating a separate marketplace for each of the MNOs 115A-N, the revenue generator A 110A may create separate advertisements compatible with the underlying technology of each MNO.

The service provider 130 may implement the separation of keywords by utilizing a data field to indicate which carrier a carrier listing may apply to. For example, a revenue generator A 110A may have several listings for the same keyword; however, they may be differentiated by a data field indicating which carrier each listing applies to. Alternatively or in addition, if the database architecture does not support the addition of a separate field, or if the service provider 130 wishes to utilize the functionality of an existing web search marketing system, the keywords for each carrier may be separated by adding prefixes to the keywords. In this case, each of the carriers may be identified by a unique prefix identifier. The prefix identifier may include a combination of the geographical location of the carrier and a descriptor of the carrier. For example, the carrier SPRINT may have a prefix of "usmobsprintsb".

The prefix may be separated from the keyword by a keyword separator, such as the character string "vxv". The purpose of the keyword separator may be to identify the location in the character string where the prefix ends and the keyword begins. The "vxv" keyword separator may be particularly functional in this regard, because this sequence of letters may very rarely, or never, appear in the English language. Thus, the presence of the "vxv" character string may indicate the end of the prefix and the beginning of the keyword. For example, if the revenue generator A 110A bid on the keyword "dvd" for users on the carrier SPRINT, the keyword may be stored in an existing search marketing database as "usmobsprintsbvxvdvd". The service provider 130 may later search for the advertisements associated with SPRINT for the keyword "dvd" by searching for the keyword "usmobsprintsbvxvdvd".

If the revenue generator A 110A does not have a mobile site URL for the MNO A 115A, the revenue generator A 110A may still bid on a keyword for the MNO A 115A. In this case, the service provider 130 may dynamically create a "WAP ad." The "WAP ad" may be an offer landing page containing the phone number of the advertiser and/or the logo of the advertiser. When a user AA 120AA clicks on the advertisement of the revenue generator A 110A who does not have a mobile site, the user AA 120AA may be taken to a page showing the phone number and/or logo of the revenue generator A 110A. The user AA 120AA may then use their mobile device to call the phone number of the revenue generator A 110A and complete their transaction. The data associated with the "WAP ad" may be stored in the advertisement title and/or the advertisement description fields.

The keywords may represent one or more search terms that the revenue generator A 110A wishes to associate with their advertisement. When a user AA 120AA searches for a search keyword via MNO A 115A, the mobile advertisement of the revenue generator A 110A may be displayed on the search results page. The service provider 130 may also implement directory search implementations, where the user AA 120AA may click through directories of families of related data. In this instance the search keyword may be the name of the directory the user AA 120AA clicks on. Alternatively or in addition the user AA 120AA may interact with the service provider 130 through an SMS search service.

For example, a revenue generator A 110A, such as DAIMLERCHRYSLER, may desire to target a mobile advertisement for a DAIMLERCHRYSLER JEEP to users 120AA-NA on MNO A 115A searching for the keywords "JEEP." DAIMLERCHRYSLER may place a bid with the service provider 130 for the keyword "JEEP" on MNO A 115A. The mobile advertisement of the revenue generator A 110A may be displayed when one of the users 120AA-NA on the MNO A 115A searches for the keyword "JEEP," or clicks through a directory named "JEEP." DAIMLERCHRYSLER may be able to use the same interface to submit bids for "JEEP" on any of the MNOS 115A-N.

The advertisement title may represent the data the revenue generator A 110A wishes to be displayed to a user AA 120AA when the user AA 120AA searches for the keyword associated with the listing. Alternatively or in addition, the advertisement description may represent the data the revenue generator A 110A wishes to be displayed to a user AA 120AA when the user AA 120AA searches for the keyword associated with the listing. The mobile site URL may represent the link the revenue generator A 110A wishes a user AA 120AA to be directed to upon clicking on the mobile advertisement of the revenue generator A 110A, such as the home page of the revenue generator A 110A. The bid amount may represent a maximum amount the revenue generator A 110A may be willing to pay each time a user AA 120AA may click on the mobile advertisement of the revenue generator A 110A or each time the mobile advertisement of the revenue generator A 110A may be shown to a user AA 120AA.

There may be some instances where multiple revenue generators 110A-N may have bid on the same search keyword for the same MNO, such as MNO A 115A. The service provider 130 may serve to the users 120AA-NA the online advertisements that the users 120AA-NA may be most likely to click on. For example, the service provider 130 may include a relevancy assessment to determine the relevancy of the multiple mobile advertisements to the search keyword. The more relevant a mobile advertisement may be to the keyword the more likely it may be that the user AA 120AA may click on the advertisement. Exemplary ways to determine relevance are described in more detail below. Methods for assessing relevancy in online web search marketing may also apply to mobile search marketing.

When one of the users 120AA-NN, such as the user AA 120AA, interacts with the service provider 130, such as by searching for a keyword, the service provider 130 may retain data describing the interaction with the user AA 120AA. The retained data may include the keyword searched for, the geographic location of the user AA 120AA, and the date/time the user AA 120AA interacted with the service provider 130. The data may also generally include any data available to the service provider 130 that may assist in describing the interaction with the user AA 120AA, or describing the user AA 120AA. The service provider 130 may also store data that indicates whether a mobile advertisement of one of the revenue generators 110A-N, such as the revenue generator A 110A was displayed to the user AA 120AA, and whether the user AA 120AA clicked on the mobile advertisement.

The service provider 130 may already have information relating to the geographic location of the user AA 120AA and other information describing the user A 120A, such as gender, age, etc. This information may have been previously supplied to the service provider 130 by the user AA 120AA. Alternatively or in addition the service provider 130 may obtain the location of the user AA 120AA based on the IP address of the user AA 120AA. The service provider 130 may use a current date/time stamp to store the date/time when the user AA 120AA interacted with the service provider 130. The service provider 130 may use any of the information describing the user, or the keyword searched for by the user, in determining the relevancy of an advertisement to the search.

Furthermore, the service provider 130 may generate reports based on the data collected from the user interactions and communicate the reports to the revenue generators 110A-N to assist the revenue generators 110A-N in measuring the effectiveness of their mobile advertising. The reports may indicate the number of times the users 120AA-NN searched for the keywords bid on by the revenue generators 110A-N, the number of times a mobile advertisement of the revenue generators 110A-N was displayed to the users 120AA-NN, and the number of times the users 120AA-NN clicked through on the advertisements of the revenue generators 110A-N. There may be a separate report for each MNO 115A-N the revenue generator A 110A maintains a carrier listing for. There may be a report displaying the aggregate data across all of the MNOs 115A-N the revenue generator A 110A maintains an carrier listing for. The reports may also generally indicate any data that may assist the revenue generators 110A-N in measuring the effectiveness of their mobile advertising campaigns.

Figure 2:
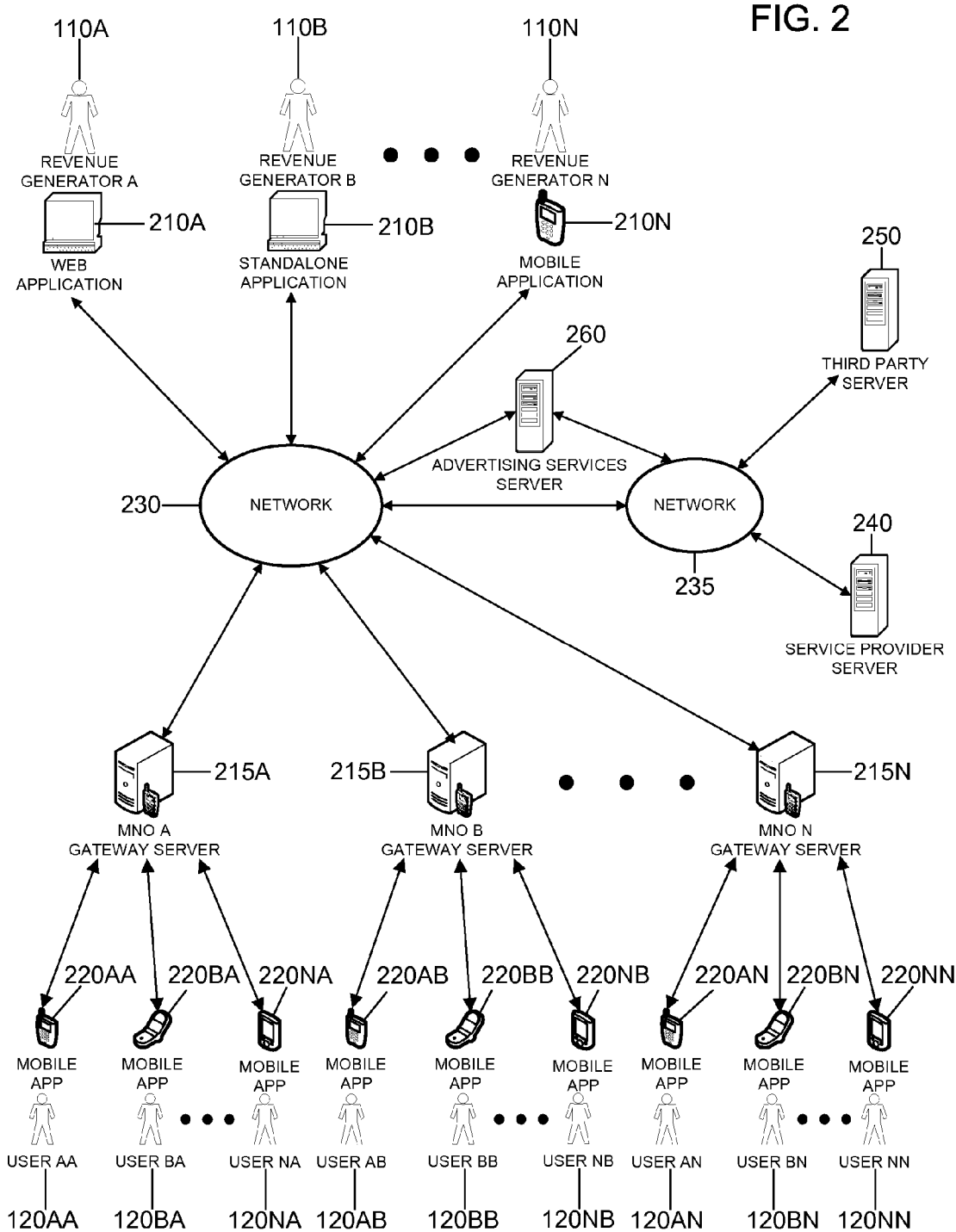
FIG. 2 is block diagram of a simplified view of a network environment implementing a system for creating separate data serving spaces for each mobile carrier in a plurality of mobile carriers.

FIG. 2 provides a simplified view of a network environment implementing a system 200 for creating separate data serving spaces for each mobile carrier in a plurality of mobile carriers. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The system 200 may include one or more web applications, standalone applications and mobile applications 210A-N, which may be collectively or individually referred to as client applications of the revenue generators 110A-N. The system 200 may also include one or more mobile applications, or mobile apps 220AA-NN, which may collectively be referred to as client applications of the users 120AA-NN, or individually as a user client application. The system 200 may also include one or more MNO gateway servers 215A-N, a network 230, a network 235, the service provider server 240, a third party server 250, and an advertising services server 260.

Some or all of the advertising services server 260, service provider server 240, and third-party server 250 may be in communication with each other by way of network 235 and may be the system or components described below in FIG. 7. The advertising services server 260, third-party server 250 and service provider server 240 may each represent multiple linked computing devices. Multiple distinct third party servers, such as the third-party server 250, may be included in the system 200. The third-party server 250 may be an MNO gateway server 215A-N or a server associated with, or in communication with an MNO gateway server 215A-N.

The networks 230, 235 may include wide area networks (WAN), such as the internet, local area networks (LAN), campus area networks, metropolitan area networks, or any other networks that may allow for data communication. The network 230 may include the Internet and may include all or part of network 235; network 235 may include all or part of network 230. The networks 230, 235 may be divided into sub-networks. The sub-networks may allow access to all of the other components connected to the networks 230, 235 in the system 200, or the sub-networks may restrict access between the components connected to the networks 230, 235. The network 235 may be regarded as a public or private network connection and may include, for example, a virtual private network or an encryption or other security mechanism employed over the public Internet, or the like.

The revenue generators 110A-N may use a web application 210A, standalone application 210B, or a mobile application 210N, or any combination thereof, to communicate to the service provider server 240, such as via the networks 230, 235. The service provider server 240 may communicate to the revenue generators 110A-N via the networks 230, 235, through the web applications, standalone applications or mobile applications 210A-N.

The users 120AA-NN may use a mobile application 220AA-220NN, such as a mobile web browser, to communicate with the service provider server 240, via the MNO gateway servers 215A-N and the networks 230, 235. The service provider server 240 may communicate to the users 120A-N via the networks 230, 235 and the MNOs 215A-N, through the mobile applications 220AA-NN.

The web applications, standalone applications and mobile applications 210A-N, 220AA-NN may be connected to the network 230 in any configuration that supports data transfer. This may include a data connection to the network 230 that may be wired or wireless. Any of the web applications, standalone applications and mobile applications 210A-N, 220AA-NN may individually be referred to as a client application. The web application 210A may run on any platform that supports web content, such as a web browser or a computer, a mobile phone, personal digital assistant (PDA), pager, network-enabled television, digital video recorder, such as TIVO®, automobile and/or any appliance capable of data communications.

Figure 7:
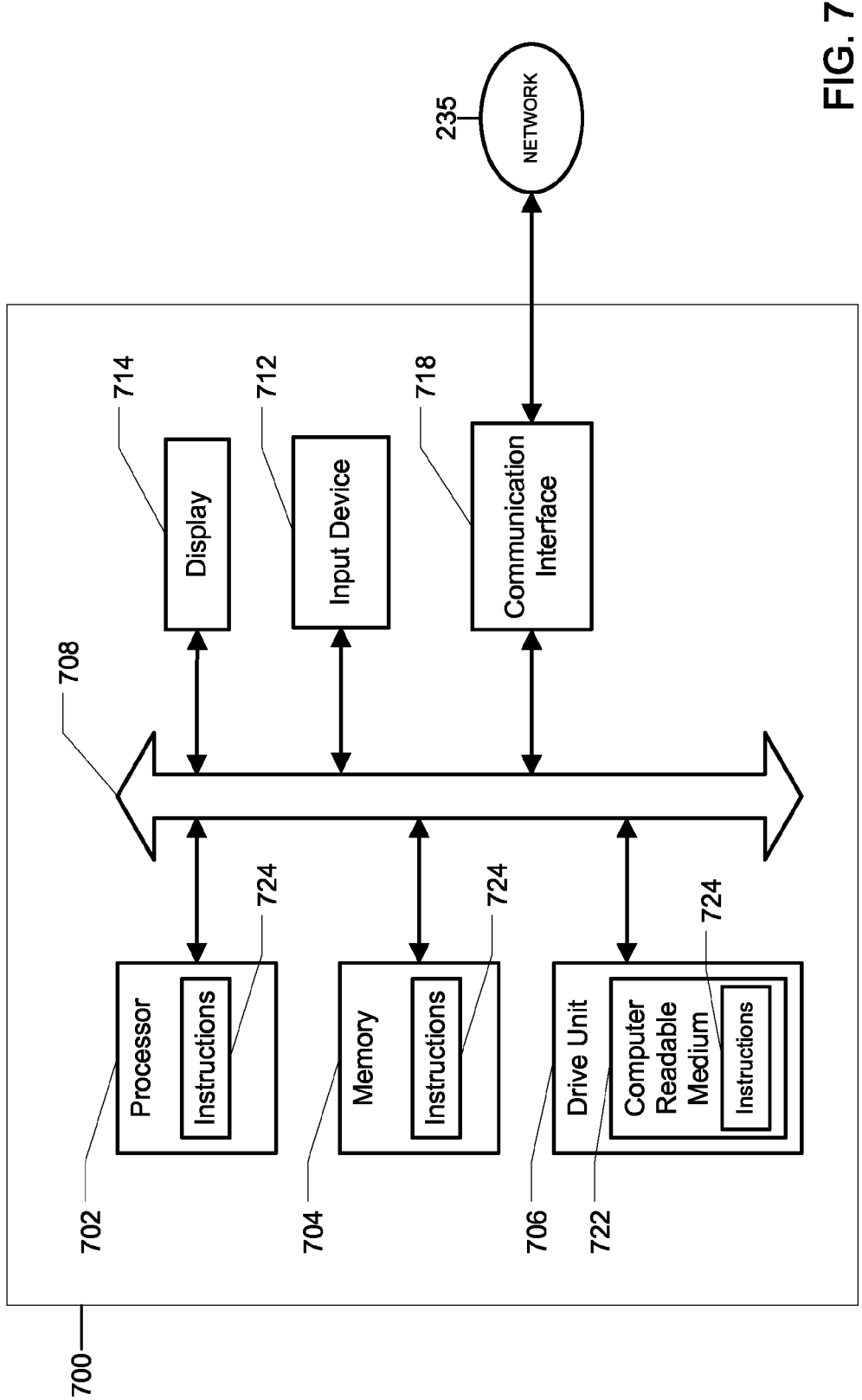
FIG. 7 is an illustration a general computer system that may be used in a system for creating separate data serving spaces for each mobile carrier in a plurality of mobile carriers.

The standalone applications 210B may run on a machine that may have a processor, memory, a display, a user interface and a communication interface, such as the computing device disclosed in FIG. 7. The processor may be operatively connected to the memory, display and the interfaces and may perform tasks at the request of the standalone applications 210B or the underlying operating system. The memory may be capable of storing data. The display may be operatively connected to the memory and the processor and may be capable of displaying information to the revenue generator B 110B. The user interface may be operatively connected to the memory, the processor, and the display and may be capable of interacting with a revenue generator B 110B. The communication interface may be operatively connected to the memory, and the processor, and may be capable of communicating through the networks 230, 235 with the service provider server 240, third party server 250 and advertising services server 260. The standalone applications 210B may be programmed in any programming language that supports communication protocols. These languages may include: SUN JAVA, C++, C#, ASP, SUN JAVASCRIPT, asynchronous SUN JAVASCRIPT, or ADOBE FLASH ACTIONSCRIPT, amongst others.

The mobile applications 210N, 220AA-NN may run on any mobile device which may have a data connection. The mobile applications 210N, 220AA-NN may be a web application 210A, a standalone application 210B, or a mobile browser. The mobile device may be one of a broad range of electronic devices which may include mobile phones, PDAs, and laptops and notebook computers. The mobile device may have a reduced feature set, such as a smaller keyboard and/or screen, and may be incapable of supporting a traditional web search.

The data connection of the mobile device may be a cellular connection, such as a GSM/GPRS/WCDMA connection, a wireless data connection, an internet connection, an infra-red connection, a Bluetooth connection, or any other connection capable of transmitting data. The data connection may be used to connect directly to the network 230, or to connect to the network 230 through the MNO gateway servers 215A-N. The MNO gateway servers 215A-N may control the access the mobile applications 210AA-NN may have to the network. The MNO gateway servers 215A-N may also control the technology supporting the respective mobile applications 220AA-NN. This may affect all aspects of the user experience, such as signal strength and availability, speed and billing mechanisms. For example, the MNO gateway server A 215A may only allow the users 120AA-NA access to content provided by partners of the MNO A 115A. Furthermore, the MNO gateway servers 215A-N may only allow users 120AA-NN access to data in a specific format, such as WML, XHTML, NTT DOCOMO IMODE HTML, or cHTML. Alternatively or in addition, the mobile applications 220AA-NN may only support one of the aforementioned formats.

The service provider server 240 may include one or more of the following: an application server, a data source, such as a database server, a middleware server, and an advertising services server. One middleware server may be a mobile commerce platform, such as the YAHOO! SUSHI platform, which may properly encode data, such as mobile pages or mobile advertisements, to the formats specific to the MNO gateway servers 215A-N. The service provider server 240 may co-exist on one machine or may be running in a distributed configuration on one or more machines. The service provider server 240 may collectively be referred to as the server. The service provider server 240 may receive requests from the users 120AA-NN and the revenue generators 110A-N and may serve mobile pages to the users 120AA-NN and web pages and/or mobile pages to the revenue generators 110A-N based on their requests.

The third party server 250 may include one or more of the following: an application server, a data source, such as a database server, a middleware server, and an advertising services server. The third party server 250 may co-exist on one machine or may be running in a distributed configuration on one or more machines. The advertising services server 260 may provide a platform for the inclusion of advertisements in pages, such as web pages or mobile pages. The advertising services server 260 may be used for providing mobile advertisements that may be displayed to the users 120AA-NN.

The service provider server 240, the third party server 250 and the advertising services server 260 may be one or more computing devices of various kinds, such as the computing device in FIG. 7. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web application 210A may employ HTTP to request information, such as a web page, from a web server, which may be a process executing on the service provider server 240 or the third-party server 250.

There may be several configurations of database servers, application servers, middleware servers and advertising services servers included in the service provider server 240 or the third party server 250. Database servers may include MICROSOFT SQL SERVER, ORACLE, IBM DB2 or any other database software, relational or otherwise. The application server may be APACHE TOMCAT, MICROSOFT IIS, ADOBE COLDFUSION, YAPACHE or any other application server that supports communication protocols. The middleware server may be any middleware that connects software components or applications. The application server on the service provider server 240 or the third party server 250 may serve pages, such as web pages to the users 120A-N and the revenue generators 110A-N. The advertising services server 260 may also exist independent of the service provider server 240 and the third party server 250.

The networks 230, 235 may be configured to couple one computing device to another computing device to enable communication of data between the devices. The networks 230, 235 may generally be enabled to employ any form of machine-readable media for communicating information from one device to another. Each of networks 230, 235 may include one or more of a wireless network, a wired network, a local area network (LAN), a wide area network (WAN), a direct connection such as through a Universal Serial Bus (USB) port, and the like, and may include the set of interconnected networks that make up the Internet. The networks 230, 235 may include any communication method by which information may travel between computing devices.

Figure 3:
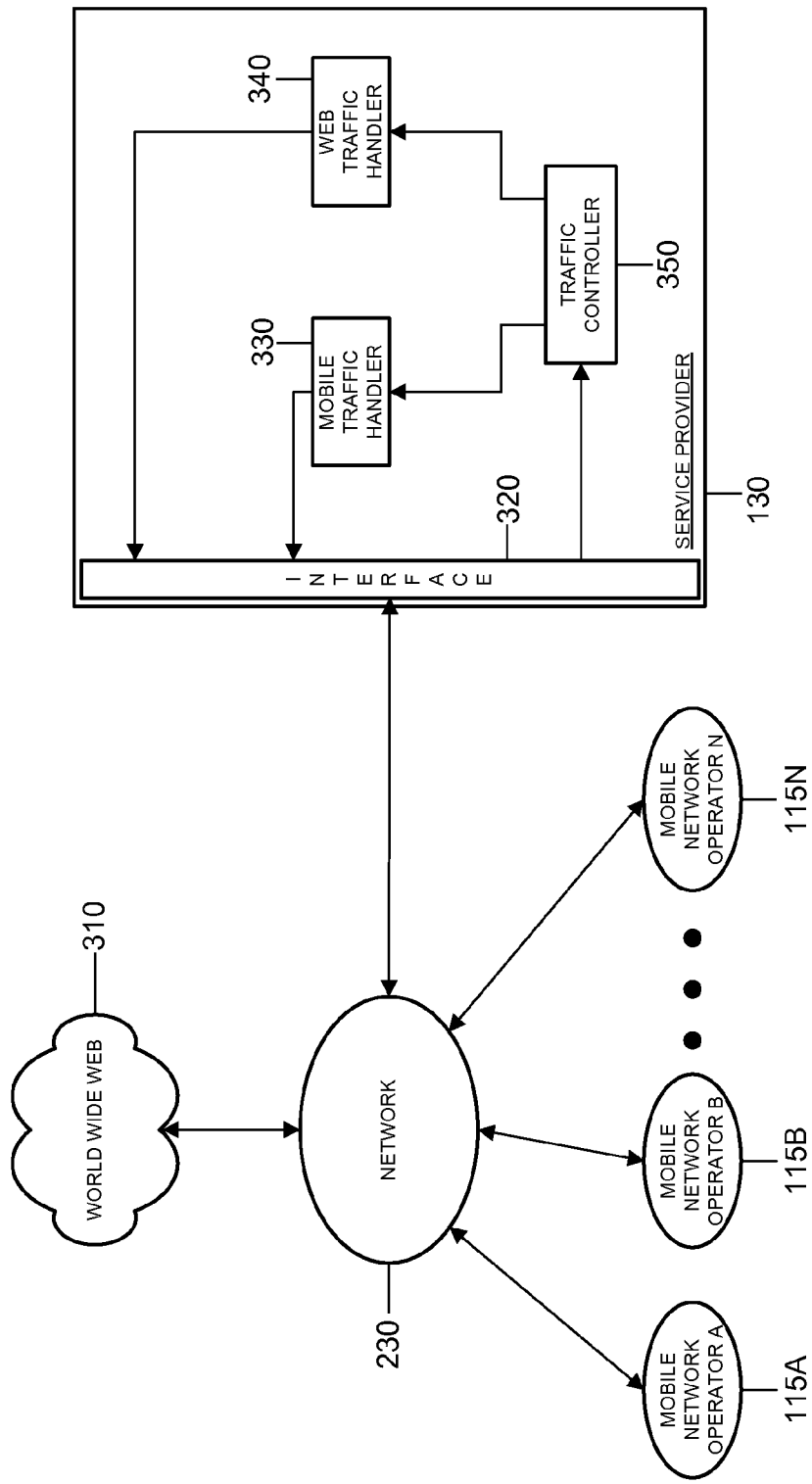
FIG. 3 is a block diagram of a system for creating separate data serving spaces for each mobile carrier in a plurality of mobile carriers.

FIG. 3 provides a view of the functionality of creating separate data serving spaces for each mobile carrier in a plurality of mobile carriers. Not all of the depicted components may be required, however, and some implementations may include additional components not shown in the figure. Variations in the arrangement and type of the components may be made without departing from the spirit or scope of the claims as set forth herein. Additional, different or fewer components may be provided.

FIG. 3 may include the world wide web 310, MNO A 115A, MNO B 115B, MNO N 115N, the network 230, and the service provider 130. The service provider may include an interface 320, a traffic controller 350, a mobile traffic handler 330, and a web traffic handler 340.

The world wide web 310 may represent all applications connected to the world wide web 310, interacting with the service provider 130, capable of the full search functionality provided by standard HTML web pages, such as the web application A 210A. The MNOs 115A-N may represent the applications connected to the MNOs 115A-N interacting with the service provider 130, such as the mobile applications 220AA-NN. The service provider 130 may utilize the interface 320 to receive the traffic from the network 230. The traffic controller 350 may determine the origin of the traffic and direct the traffic to the appropriate handler, the mobile traffic handler 330 or the web traffic handler 340.

In operation, the world wide web 310, and the MNOs 115A-N may communicate with the service provider 130 via the network 230. The service provider 130 may receive traffic from the world wide web 310 and the MNOs 115A-N through the network 230 and via the interface 320. The interface 320 may communicate the traffic to the traffic controller 350. The traffic controller 350 may determine the origin of the traffic. The traffic controller 350 may use the IP address associated with the request to determine the origin of the request.

The IP address may be obtained from the user agent string of the request. The user agent string may contain information relating to the source of the request, such as the IP address or the carrier ID. All requests from any user on a given MNO gateway server may have the same, or similar, IP addresses. Thus, a request from a particular MNO gateway server or from an MNO in general, may be identifiable by the IP address of the request. The carrier ID may also be capable of identifying the source of the request as an MNO gateway server.

Alternatively or in addition the service provider 130 may provide distinct mobile search sites for each of the MNOs 115A-N and the world wide web. The mobile search sites may contain a hidden input variable or some other indicator that indicates the source of the search request. For example the mobile search site for the carrier SPRINT may include a hidden INPUT variable with a value of "usmobsprintsb" indicating that the search request originated from the MNO SPRINT. Alternatively or in addition the service provider 130 may provide a dedicated feed for each of the MNOs 115A-N. The feed may be implemented by a separate application server for each of the MNOs 115A-N. The particular feed the request is received from may indicate the source of the request.

Once the traffic controller 350 determines the origin of the traffic the traffic controller 350 may forward the traffic to the appropriate handler. If the traffic originated from one of the MNOs 115A-N, then the traffic may be directed to the mobile traffic handler 330. If the traffic was generated from the world wide web 310, the traffic controller 350 may direct the traffic to the web traffic handler 340. If the system 100 implements keyword separation through the use of a database field, the traffic controller 350 may supply the origin of the request to the mobile traffic handler 330.

If the system 100 implements keyword separation through the use of prefix identifiers, the traffic controller 350 may determine the origin of the traffic and add the prefix associated with the origin and the keyword separator to the keyword. For example, if a keyword search for "dvd" originated from the carrier SPRINT, the traffic controller 350 may add the prefix "usmobsprintsb" followed by "vxv" to "dvd," resulting in "usmobsprintsbvxvdvd". The search keyword may then be forwarded to the mobile traffic handler 330 as "usmobsprintsbvxvdvd". The mobile traffic handler 330 may then use "usmobsprintsbvxvdvd" to determine which advertisements may relate to the keyword "dvd" on the carrier SPRINT. Alternatively or in addition, all traffic may be handled by one handler, such as the web traffic handler 340.

The mobile traffic handler 330 may receive the keyword and the origin of the request from the traffic controller 350. The mobile traffic handler 330 may then determine which advertisements to return to the user, such as the user AA 120AA. The mobile traffic handler 330 may first identify the carrier, such as the MNO A 115A. Only advertisements associated with bids on the keyword for the MNO A 115A may be selected. In the case of prefix identifiers, the step of identifying the carrier may be used to identify the proper prefix. The mobile traffic handler 330 may then select one or more advertisements to be returned to the user AA 120AA. The determination may be based on the amount bid on for the advertisement, such as the advertisement associated with the highest bid for the keyword on the MNO may be displayed to the user AA 120AA. Alternatively or in addition the mobile traffic handler 330 may account for the relevancy of the advertisement to the keyword or other methods utilized by web search marketing technology, such as the YAHOO! SEARCH MARKETING technology. The advertisement may consist of a link to the mobile URL site of a revenue generator and the advertisement title and/or description as the text of the link displayed to the user AA 120AA.

If a revenue generator A 110A does not have a mobile ad for the MNO A 115A, the mobile traffic handler 330 may use the aforementioned "WAP ad" in lieu of a mobile advertisement. The "WAP ad" may include the phone number of the revenue generator A 110A and/or a logo of the revenue generator A 110A. The data for the "WAP" ad may be stored in the advertisement title or advertisement description field of the MNO listing. The "WAP ad" may allow the revenue generators 110A-N to bid on keywords for a mobile carrier even if they don't have a mobile site or a mobile site supporting the technology of the carrier.

The service provider 130 may have technology capable of generating a "WAP ad", or "call offer," for each of the mobile carriers based on the advertisement title and/or logo of the revenue generator A 110A. For example, the service provider 130 may have a database table containing a row for each of the MNOs 115A-N and a field containing skeleton code for generating a "WAP ad" for each MNO 115A-N. The service provider 130 may simply retrieve the "WAP ad" skeleton code and insert the text of the advertisement title and/or description and/or the logo of the revenue generator A 110A. The service provider 130 may then host the "WAP ad" on behalf of the revenue generator A 110A.

Alternatively, or in addition, the service provider 130 may utilize middleware, such as the YAHOO! SUSHI platform, to properly encode the "WAP ads" for each MNO 115A-N. The data associated with the "WAP ad" may be communicated to the middleware in XML format and the middleware may encode the "WAP ad" to conform to the underlying technology of each MNO 115A-N, such as WML, XHTML, NTT DOCOMO IMODE HTML, or cHTML.

The mobile traffic handler 330 may then communicate the advertisement to the interface 320. The interface 320 may communicate the advertisement and search results to the mobile application AA 220AA via the network 230 and the MNO A 115A. The mobile application AA 220AA may display the advertisement to the user AA 120AA.

Figure 4:
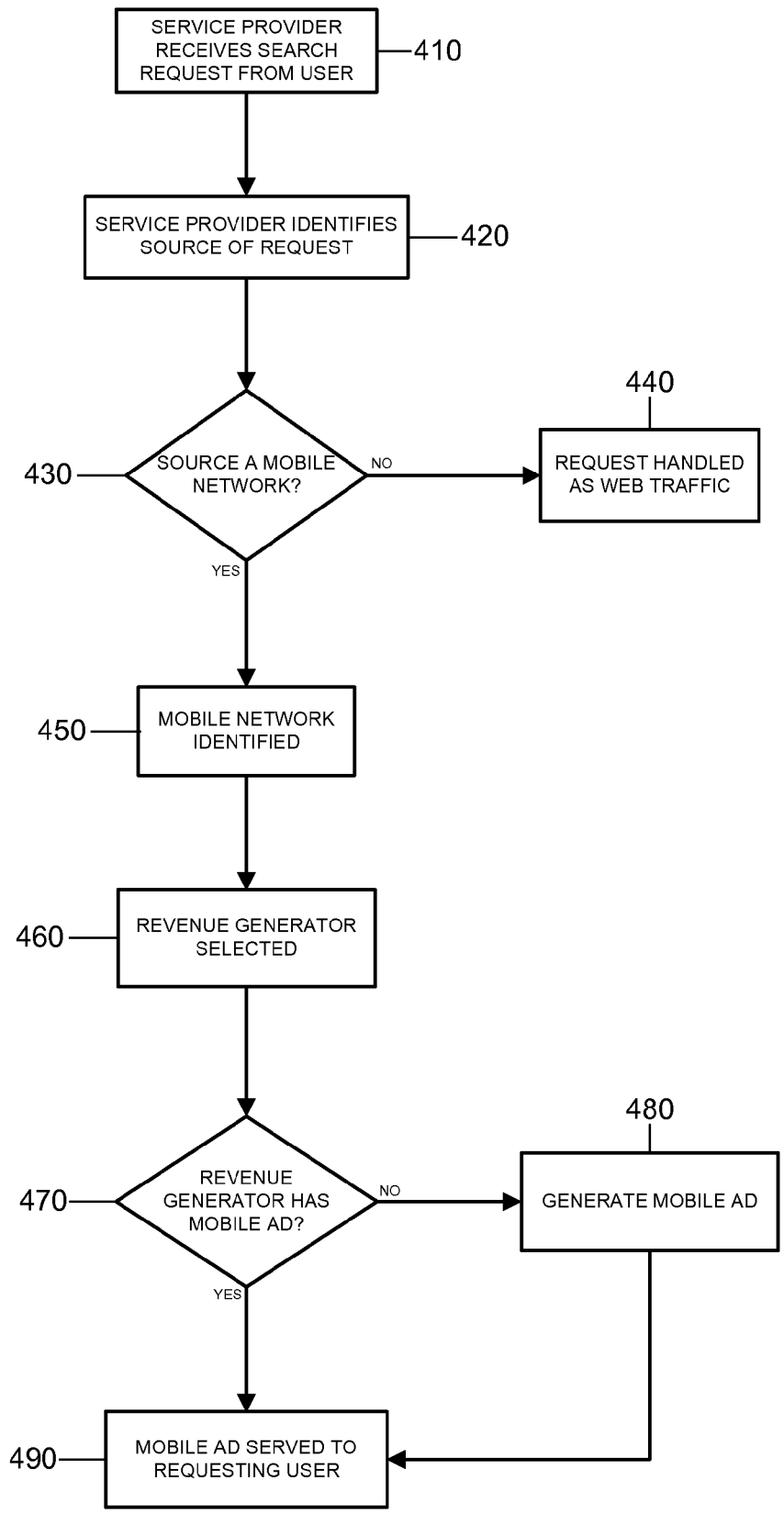
FIG. 4 is a flowchart illustrating the operations of the systems of FIG. 1, FIG. 2, and FIG. 3, or other systems for creating separate data serving spaces for each mobile carrier in a plurality of mobile carriers.

FIG. 4 is a flow chart illustrating the operations of the systems of FIG. 1, FIG. 2, and FIG. 3, or other systems for creating separate data serving spaces for each mobile carrier in a plurality of mobile carriers. At block 410, the service provider 130 may receive a keyword search request from one of the users 120AA-NN, such as the user AA 120AA. At block 420 the service provider 130 may identify the source of the request, such as by identifying the IP address of the requesting user AA 120AA. The IP address of the request may be used to determine whether the request originated from a mobile network, and, if so, which mobile network. If the request was generated by a page belonging to the service provider 130, the page may have hidden variables identifying the source MNO of the request. Alternatively or in addition the service provider 130 may have a dedicated feed for the MNO.

At block 430, the service provider 130 may determine whether the request originated from a mobile network. If the request did not originate from a mobile network, the system 100 may move to block 440. At block 440 the request may be handled as traditional web traffic and may be forwarded to the web search marketing system. If the service provider 130 determines the request was generated from a mobile network the system 100 may move to block 450. At block 450 the originating mobile network may be identified, such as the MNO A 115A. The mobile network may be identified by the IP address of the requesting user AA 120AA. If the request was generated by a page belonging to the service provider 130, the page may have hidden variables identifying the source MNO of the request. Alternatively or in addition the service provider 130 may have a dedicated feed for the MNO.

Once the originating mobile network is determined the system 100 may move to block 460. At block 460 the service provider 130 may select one or more revenue generators 110A-N who may have bid on the keyword for the originating MNO. The service provider 130 may select the revenue generator 110A-N with the highest bid for the keyword on the originating mobile network, such as the MNO A 115A. Alternatively or in addition, the service provider 130 may utilize any methods used to select advertisements of the revenue generators 110A-N in web based search marketing systems. The methods may include combining the bid amounts with a relevancy assessment to determine which advertisement or "WAP ad" may be most relevant to the keyword searched for by the user AA 120AA.

Once the revenue generator, such as the revenue generator A 110A, has been selected the system 100 may move to block 470. At block 470 the service provider 130 may determine whether the revenue generator A 110A has a mobile advertisement for the MNO A 115A. If the revenue generator A 110A does not have a mobile advertisement the system 100 may move to block 480. At block 480 the service provider 130 may generate the aforementioned "WAP ad" for the revenue generator A 110A. The "WAP" ad may be based on data stored in the advertisement title and/or advertisement description field of the MNO listing.

If the revenue generator A 110A has a mobile advertisement for the MNO A 115A, or once the "WAP ad" has been generated, the system 100 may move to block 490. At block 490 the service provider 130 may serve the mobile advertisement and search results to the requesting user AA 120AA. The service provider 130 may communicate the data to the MNO A 115A through the networks 230, 235. The MNO A 115A may communicate the data to the user AA 120AA.

Figure 5:
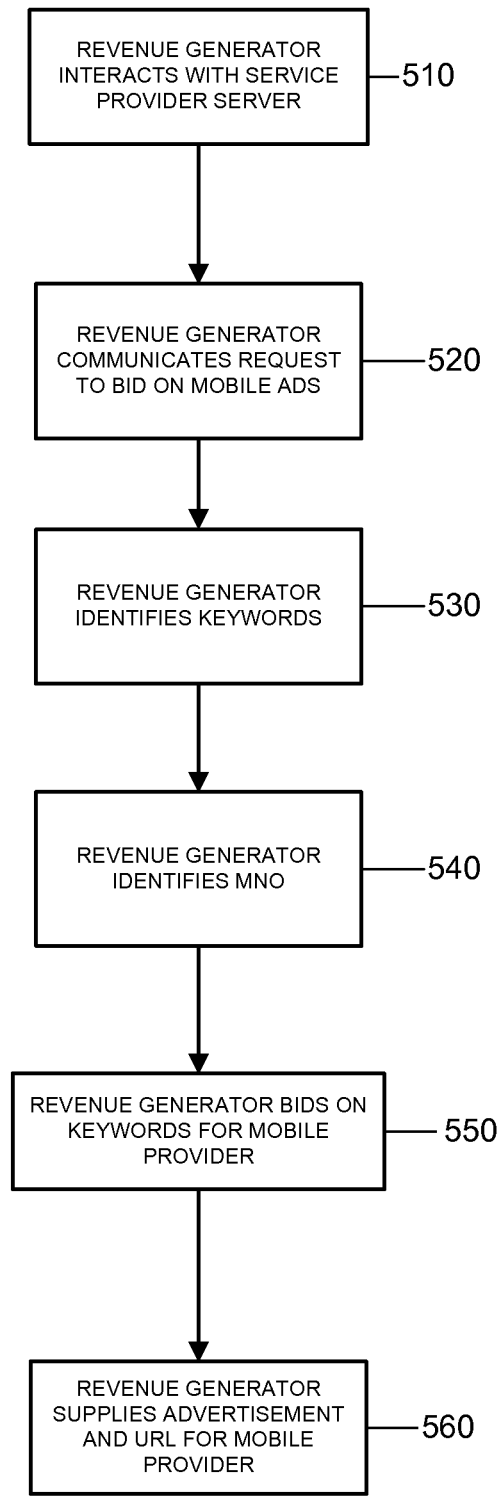
FIG. 5 is a flowchart illustrating steps that may be taken by a revenue generator in the systems of FIG. 1, FIG. 2, and FIG. 3, or other systems for creating separate data serving spaces for each mobile carrier in a plurality of mobile carriers.

FIG. 5 is a flowchart illustrating steps that may be taken by one of the revenue generators 110A-N in the systems of FIG. 1, FIG. 2, and FIG. 3, or other systems for creating separate data serving spaces for each mobile carrier in a plurality of mobile carriers. The steps may occur when one of the revenue generators 110A-N, such as the revenue generator A 110A, wishes to bid on keywords for a carrier, such as the MNO A 115A. At block 510 the revenue generator A 110A interacts with the service provider server 240, such as by logging onto the service provider 130. At block 520 the revenue generator A 110A may communicate a request to bid on mobile keywords.

At block 530 the revenue generator A 110A may communicate information identifying the keyword the revenue generator A 110A wishes to bid on. At block 540 the revenue generator A 110A may identify one or more MNOs 115A-N, such as the MNO A 115A, that the revenue generator A 110A wishes the bid for the keyword to apply to. Once the revenue generator A 110A identifies one or more MNOs 115A-N, the system 100 may move to block 550. At block 550 the revenue generator A 110A may place a bid on the identified keyword for the MNO A 115A. The bid made by the revenue generator A 110A may only apply to the keyword when searched for on the MNO A 1115A. The revenue generator A 110A may specify one or more other MNOs 115B-N which the bid may apply to.

At block 540, the revenue generator A 110A may communicate to the service provider 130 a mobile advertisement and a mobile URL the advertisement may link to. The mobile advertisement may consist of a description of the advertisement and/or a title of the advertisement. The limited space available on the screens of mobile devices may necessitate that a mobile advertisement be relatively shorter than a web advertisement. Alternatively or in addition, the advertisement may include other elements, such as images, audio, and/or video elements. If the revenue generator A 110A does not have a mobile URL for the MNO A 115A, the service provider 130 may generate a "WAP ad" for the revenue generator A 110A. The "WAP ad" may be a mobile page for the MNO that contains the phone number and/or the logo of the revenue generator A 110A. The "WAP ad" data may be stored in the advertisement description field of the MNO listing of the revenue generator A 110A.

Figure 6:
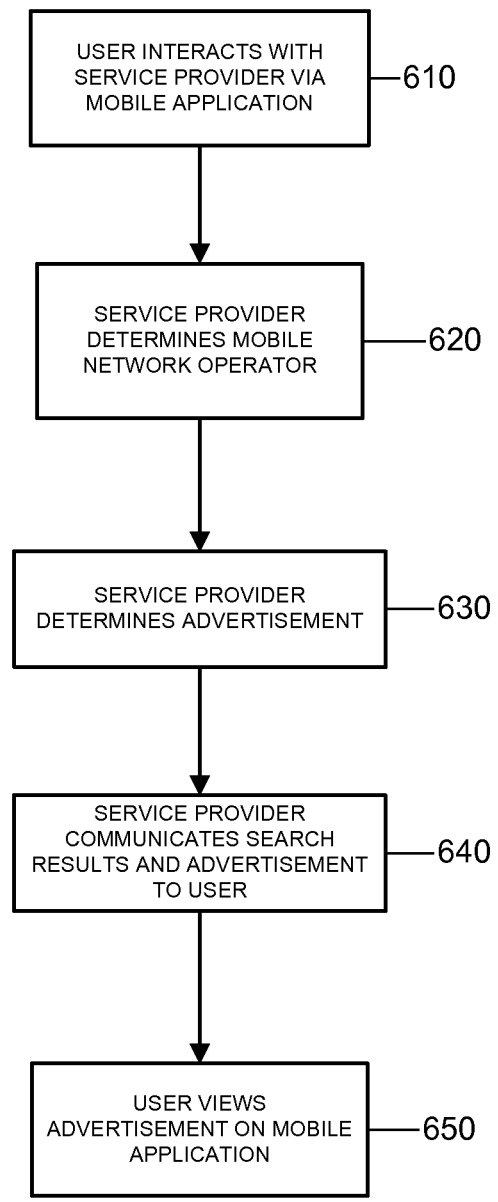
FIG. 6 is a flowchart illustrating steps that may be taken by a user in the systems of FIG. 1, FIG. 2, and FIG. 3, or other systems for creating separate data serving spaces for each mobile carrier in a plurality of mobile carriers.

FIG. 6 is a flowchart illustrating steps that may be taken by one of the users 120AA-NN in the systems of FIG. 1, FIG. 2, and FIG. 3, or other systems for creating separate data serving spaces for each mobile carrier in a plurality of mobile carriers. The steps may occur when one of the users 120AA-NN, such as the user AA 120AA, performs a search on a mobile application 220AA-NN, such as the mobile application AA 220AA, via a MNO 115A-N, such as the MNO A 115A. At block 610, the user AA 120AA may interact with the service provider 130 via the mobile application AA 220AA, such as by performing a search from the mobile application AA 220AA. At block 620 the service provider 130 may determine the carrier the request of the user AA 120AA originates from, such as the MNO A 115A. At block 630 the service provider 130 may determine which advertisements may relate to the keyword searched for on the MNO A 115A. The service provider 130 may select advertisements from revenue generators 110A-N who may have bid on the keyword searched for from the MNO A 115A. The service provider 130 may select advertisement of the revenue generator A 110A with the highest bid for the keyword from the MNO A 115A. Alternatively or in addition the service provider 130 may select more than one advertisement to display to the user AA 120AA. The size of the screen on the device of the user AA 120AA may be a factor used in determining how many advertisements to communicate to the user AA 120AA.

At block 640 the service provider 130 may communicate the advertisement and search results to the user AA 120AA via the MNO A 115A and the mobile application AA 220AA. At block 650 the user AA 120AA may view the search results and accompanying advertisement via the mobile application AA 220AA.

FIG. 7 illustrates a general computer system 700, which may represent a service provider server 240, a third party server 250, an advertising services server 260, a mobile device or any of the other computing devices referenced herein. The computer system 700 may include a set of instructions 724 that may be executed to cause the computer system 700 to perform any one or more of the methods or computer based functions disclosed herein. The computer system 700 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 724 (sequential or otherwise) that specify actions to be taken by that machine. In a particular embodiment, the computer system 700 may be implemented using electronic devices that provide voice, video or data communication. Further, while a single computer system 700 may be illustrated, the term "system" shall also be taken to include any collection of systems or subsystems that individually or jointly execute a set, or multiple sets, of instructions to perform one or more computer functions.

As illustrated in FIG. 7, the computer system 700 may include a processor 702, such as, a central processing unit (CPU), a graphics processing unit (GPU), or both. The processor 702 may be a component in a variety of systems. For example, the processor 702 may be part of a standard personal computer or a workstation. The processor 702 may be one or more general processors, digital signal processors, application specific integrated circuits, field programmable gate arrays, servers, networks, digital circuits, analog circuits, combinations thereof, or other now known or later developed devices for analyzing and processing data. The processor 702 may implement a software program, such as code generated manually (i.e., programmed).

The computer system 700 may include a memory 704 that can communicate via a bus 708. The memory 704 may be a main memory, a static memory, or a dynamic memory. The memory 704 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 704 may include a cache or random access memory for the processor 702. Alternatively or in addition, the memory 704 may be separate from the processor 702, such as a cache memory of a processor, the system memory, or other memory. The memory 704 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 704 may be operable to store instructions 724 executable by the processor 702. The functions, acts or tasks illustrated in the figures or described herein may be performed by the programmed processor 702 executing the instructions 724 stored in the memory 704. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 700 may further include a display 714, such as a liquid crystal display (LCD), an organic light emitting diode (OLED), a flat panel display, a solid state display, a cathode ray tube (CRT), a projector, a printer or other now known or later developed display device for outputting determined information. The display 714 may act as an interface for the user to see the functioning of the processor 702, or specifically as an interface with the software stored in the memory 704 or in the drive unit 706.

Additionally, the computer system 700 may include an input device 712 configured to allow a user to interact with any of the components of system 700. The input device 712 may be a number pad, a keyboard, or a cursor control device, such as a mouse, or a joystick, touch screen display, remote control or any other device operative to interact with the system 700.

The computer system 700 may also include a disk or optical drive unit 706. The disk drive unit 706 may include a computer-readable medium 722 in which one or more sets of instructions 724, e.g. software, can be embedded. Further, the instructions 724 may perform one or more of the methods or logic as described herein. The instructions 724 may reside completely, or at least partially, within the memory 704 and/or within the processor 702 during execution by the computer system 700. The memory 704 and the processor 702 also may include computer-readable media as discussed above.

The present disclosure contemplates a computer-readable medium 722 that includes instructions 724 or receives and executes instructions 724 responsive to a propagated signal; so that a device connected to a network 235 may communicate voice, video, audio, images or any other data over the network 235. The instructions 724 may be implemented with hardware, software and/or firmware, or any combination thereof. Further, the instructions 724 may be transmitted or received over the network 235 via a communication interface 718. The communication interface 718 may be a part of the processor 702 or may be a separate component. The communication interface 718 may be created in software or may be a physical connection in hardware. The communication interface 718 may be configured to connect with a network 235, external media, the display 714, or any other components in system 700, or combinations thereof. The connection with the network 235 may be a physical connection, such as a wired Ethernet connection or may be established wirelessly as discussed below. Likewise, the additional connections with other components of the system 700 may be physical connections or may be established wirelessly. In the case of a service provider server 240, a third party server 250, or an advertising services server 260, the servers may communicate with users 120A-N and the revenue generators 110A-N through the communication interface 718.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 722 may be a single medium, or the computer-readable medium 722 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 722 may include a solid-state memory such as a memory card or other package that houses one or more non-volatile read-only memories. The computer-readable medium 722 also may be a random access memory or other volatile re-writable memory. Additionally, the computer-readable medium 722 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

Figure 8:
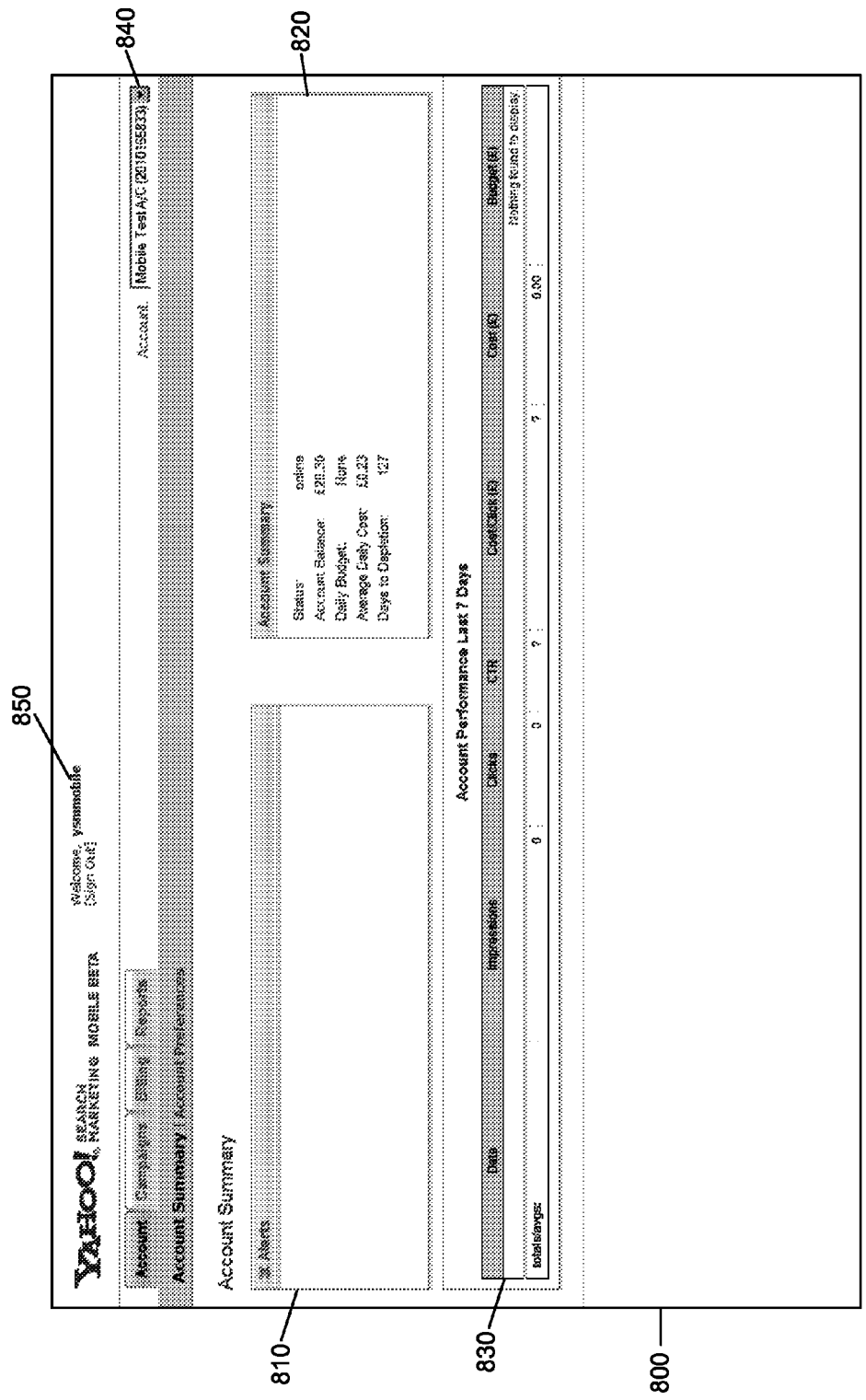
FIG. 8 is a screenshot of a revenue generator's account summary screen in the systems of FIG. 1, FIG. 2, and FIG. 3, or other systems for creating separate data serving spaces for each mobile carrier in a plurality of mobile carriers.

FIG. 8 is a screenshot 800 of an implementation of a revenue generator account summary view of a revenue generator interface in the systems of FIG. 1, FIG. 2, and FIG. 3, or other systems for creating separate data serving spaces for each mobile carrier in a plurality of mobile carriers. A revenue generator interface may be displayed to one of the revenue generators 110A-N, such as the revenue generator A 110A, when the revenue generator A 110A interacts with the service provider 130. The screenshot 800 may include an alerts table 810, an account summary table 820, an account performance table 830, an account drop-down box 840, and a revenue generator identifier 850.

The revenue generator currently interacting with the service provider 130 may be identified by the revenue generator identifier 850. In the screenshot 800, the revenue generator may be identified as "ysmmobile". The revenue generator A 110A may be able to change the account being viewed by selecting a different account from the account drop-down box 840. In the screenshot 840 the account currently being viewed may be "Mobile Test A/C (2010165833)". The alerts table 810, account summary table 820 and account performance table 830, may display data relating to the selected account, such as the "Mobile Test A/C (2010165833)" account.

The alerts table 810 may display current alerts for the selected account, such as payment reminders or a reminder that the budget of the revenue generator A 110A may be low. The account summary table 820 may display information relating to the selected account, such as the status, the account balance, the daily budget, the average daily cost, and the days to depletion. The account performance table 830 may display the performance of the selected account for the previous 7 days, or any other time period. The account performance table 830 may display account information for each of the previous days or other time period and a total for the entire time period. The account performance table 830 may display summary data from all campaigns, listings and carrier listings of the account, such as total impressions, total clicks, average click through rate, average cost per click and total cost, and the budget.

Figure 9:
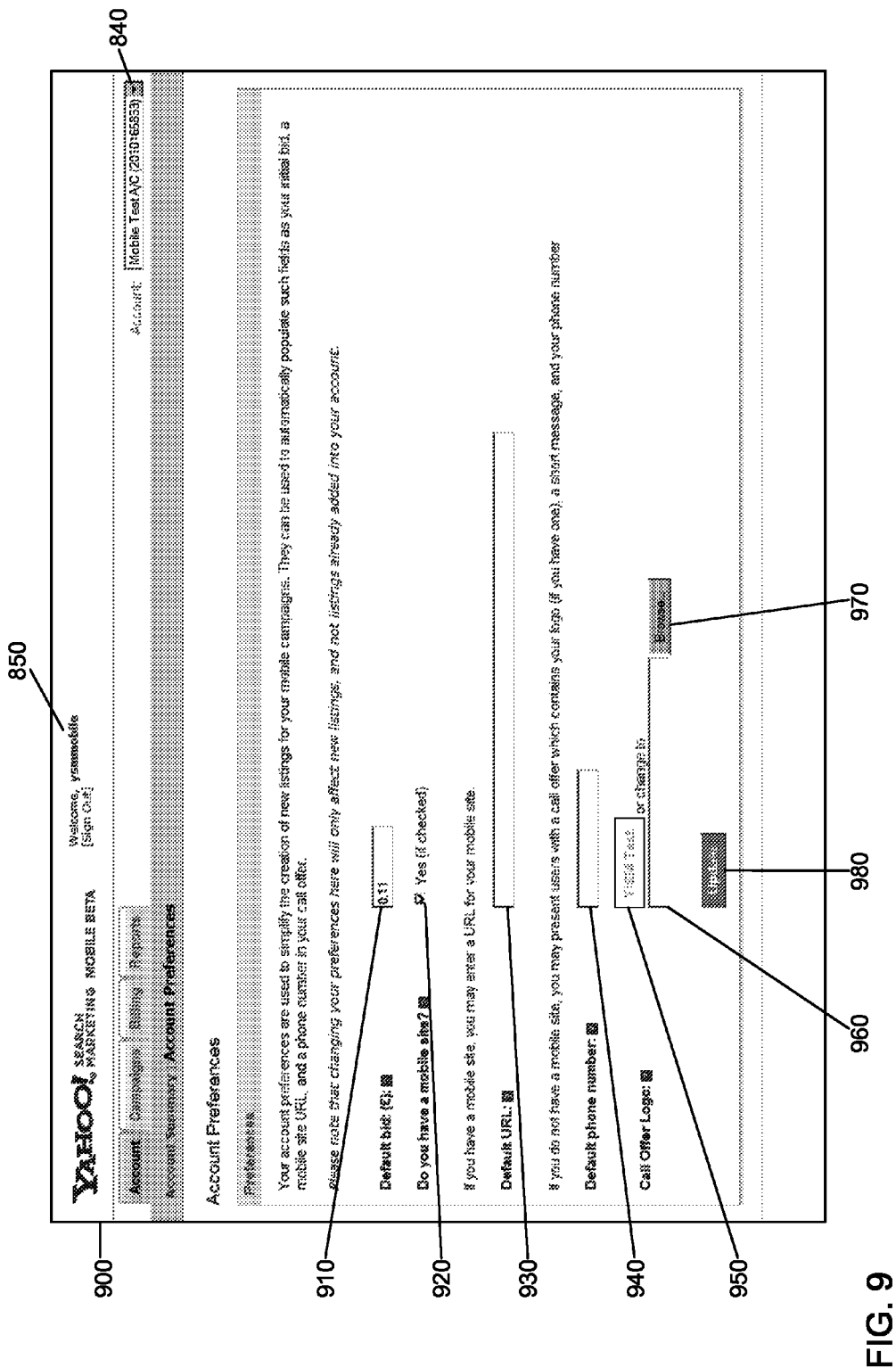
FIG. 9 is a screenshot of a revenue generator's account preferences screen in the systems of FIG. 1, FIG. 2, and FIG. 3, or other systems for creating separate data serving spaces for each mobile carrier in a plurality of mobile carriers.

FIG. 9 is a screenshot 900 of an implementation of a revenue generator account preferences view of a revenue generator interface in the systems of FIG. 1, FIG. 2, and FIG. 3, or other systems for creating separate data serving spaces for each mobile carrier in a plurality of mobile carriers. A revenue generator interface may be displayed to one of the revenue generators 110A-N, such as the revenue generator A 110A, when the revenue generator A 110A interacts with the service provider 130. The account preferences screen may allow the revenue generator A 110A to view or change default settings for the selected account. The screenshot 900 may include an account drop-down box 840, a revenue generator identifier 850, a default bid textbox 910, a mobile site checkbox 920, a default URL textbox 930, a default phone number textbox 940, a logo display 950, a logo textbox 960, a browse button 970 and an update button 980.

The revenue generator A 120A may enter a default bid amount in the default bid textbox 910. The revenue generator A 110A may check the mobile site checkbox 920 if the revenue generator A 110A has a mobile site. If the revenue generator A 110A has a mobile site, the revenue generator A 110A may enter the URL of the mobile site in the default URL textbox 930.

If the revenue generator A 110A does not have a mobile site, the service provider 130 may generate a "WAP ad" for the revenue generator A 110A. The "WAP ad" may include the phone number and logo of the revenue generator A 110A and a short message. The revenue generator A 110A may supply their phone number in the default phone number box 940. The revenue generator A 110A may specify the location of their logo in the logo textbox 960. Alternatively or in addition the revenue generator A 110A may browse for their logo by clicking on the browse button 970. A preview of the logo may be displayed in the logo display 950. The revenue generator A 110A may submit the changes to the service provider 130 by clicking on the update button 980.

Figure 10:
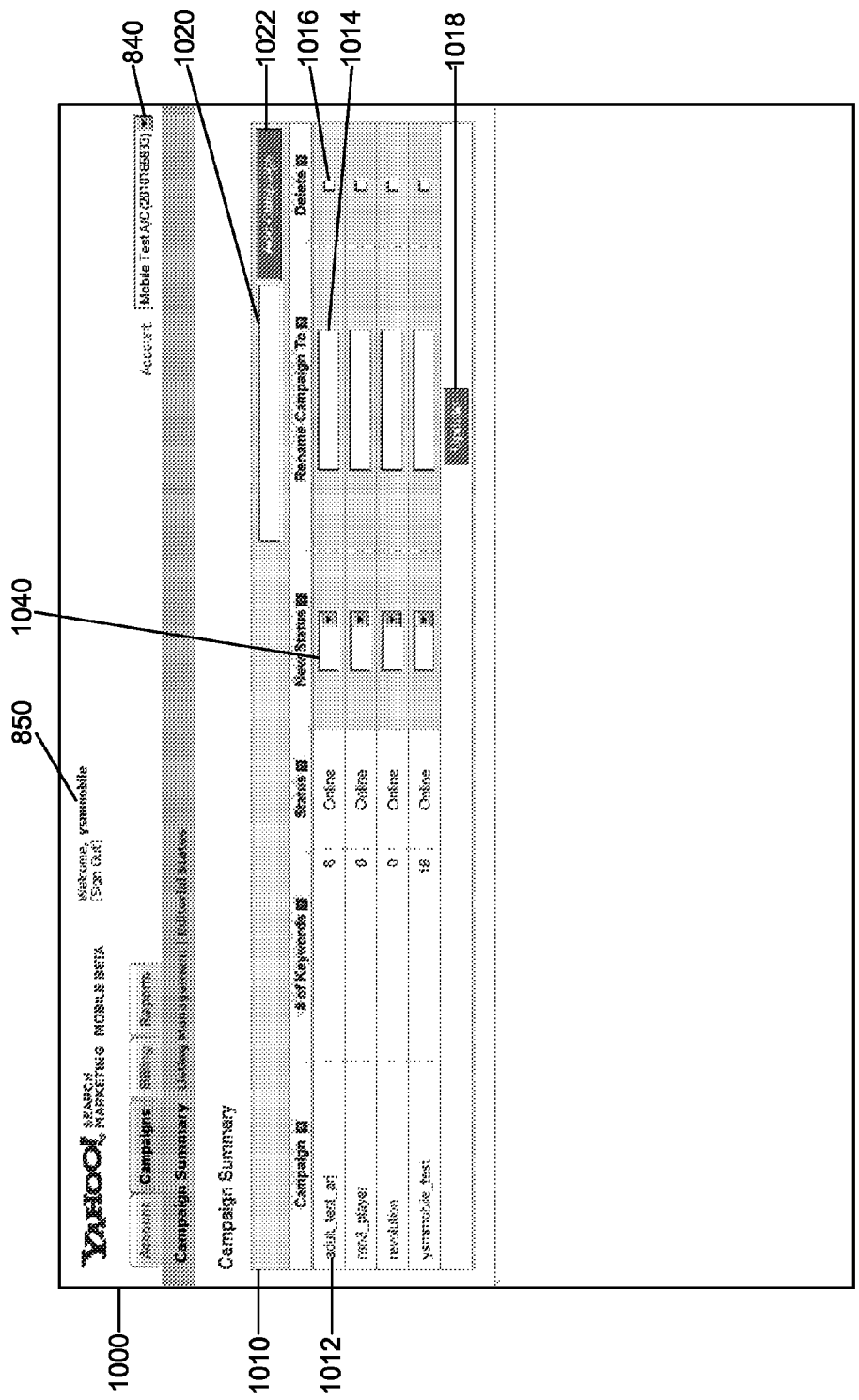
FIG. 10 is a screenshot of a revenue generator's campaign summary screen in the systems of FIG. 1, FIG. 2, and FIG. 3, or other systems for creating separate data serving spaces for each mobile carrier in a plurality of mobile carriers.

FIG. 10 is a screenshot 1000 of an implementation of a revenue generator campaign summary view of a revenue generator interface in the systems of FIG. 1, FIG. 2, and FIG. 3, or other systems for creating separate data serving spaces for each mobile carrier in a plurality of mobile carriers. A revenue generator interface may be displayed to one of the revenue generators 110A-N, such as the revenue generator A 110A, when the revenue generator A 110A interacts with the service provider 130. The campaign summary screen may allow the revenue generator A 110A to view the current campaigns, change the status of the campaigns and rename, add or delete campaigns. The screenshot 1000 may include a campaign summary table 1010, an account drop-down box 840, and a revenue generator identifier 850. The campaign summary table 1010 may include an add campaign textbox 1020, an add campaign button 1022, an update button 1018 and one or more rows of data, each representing a campaign of the revenue generator A 110A. Each row of data may include a campaign name link 1012, the number of keywords in the campaign, the status of the campaign, a new status drop-down box 1040, a rename campaign textbox 1014, and a delete checkbox 1016.

The campaign name link 1012 may display the name of the campaign to the revenue generator A 110A. If the revenue generator A 110A clicks on the campaign name link 1012, the revenue generator A 110A may be displayed a listing management screen for the campaign, such as in FIG. 11 and FIG. 12. The new status drop-down box 1040 may allow a revenue generator A 110A to change the status of the campaign, such as to offline or online. The revenue generator A 110A may be able to rename the campaign by typing a new name into the rename campaign textbox 1014. The revenue generator may be able to delete a campaign by checking the delete textbox 1016. The revenue generator A 110A may submit changes to the campaigns by clicking on the update button 1018. The revenue generator A 110A may be able to add a campaign by typing a campaign name into the add campaign textbox 1020 and then clicking on the add campaign button 1022.

Figure 11:
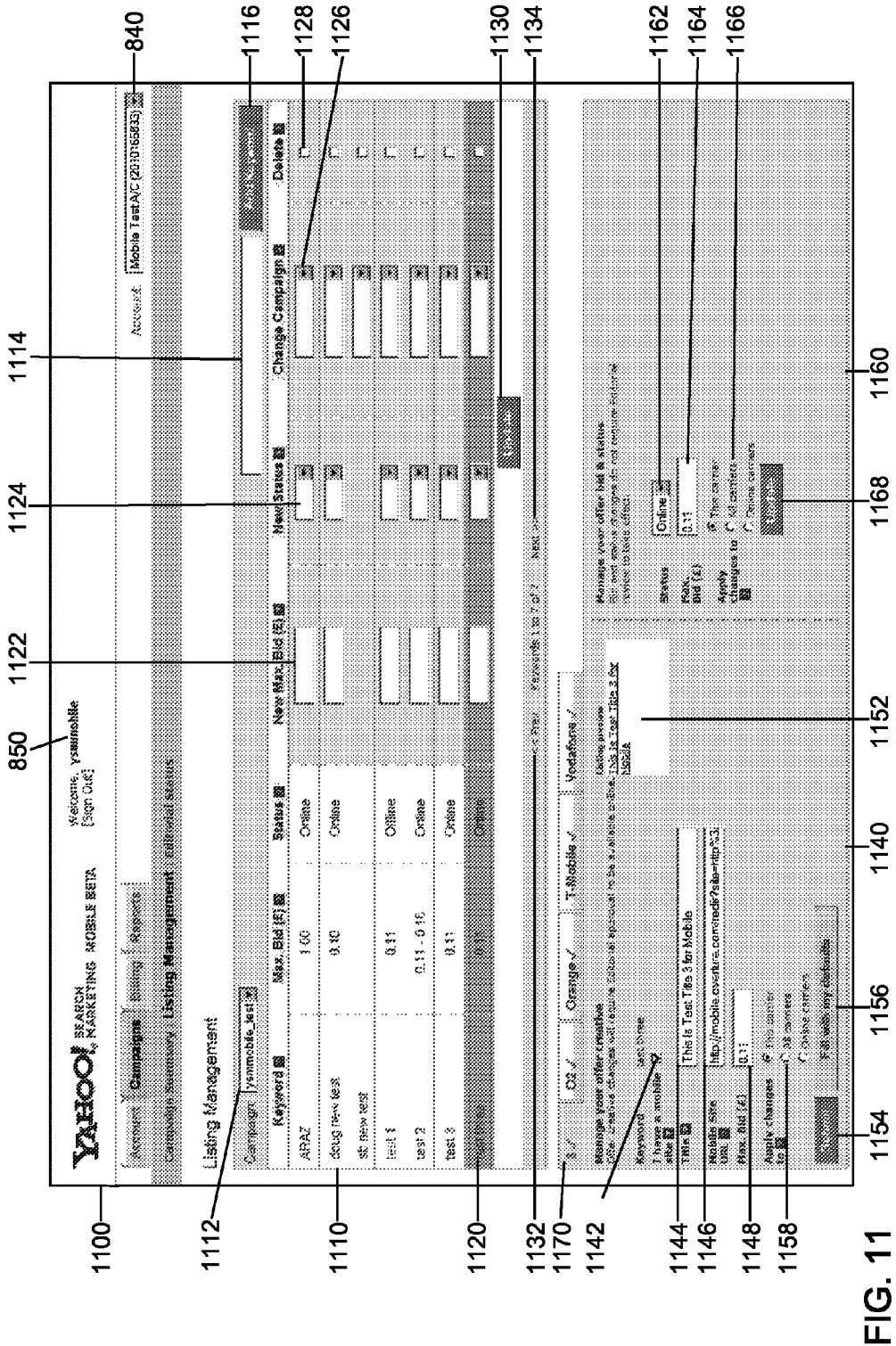
FIG. 11 is a screenshot of a revenue generator's listing management screen in the systems of FIG. 1, FIG. 2, and FIG. 3, or other systems for creating separate data serving spaces for each mobile carrier in a plurality of mobile carriers.

FIG. 11 is a screenshot 1100 of an implementation of a revenue generator listing management view of a revenue generator interface in the systems of FIG. 1, FIG. 2, and FIG. 3, or other systems for creating separate data serving spaces for each mobile carrier in a plurality of mobile carriers. A revenue generator interface may be displayed to one of the revenue generators 110A-N, such as the revenue generator A 110A, when the revenue generator A 110A interacts with the service provider 130. The listing interface screen may allow the revenue generator A 110A to add/modify/view their listings, and their carrier listings. The screenshot 1100 may include a listing summary table 1110, a manage creative table 1140, a manage offer table 1160, an account drop-down box 840, and a revenue generator identifier 850.

The listing summary table 1110 may include a campaign drop-down box 1112, an add keyword textbox 1114, an add keyword button 1116, an update listings button 1130, a previous listings link 1132, a next listings link 1134 and one or more rows of keyword data. The rows of keyword data may include a keyword link 1120, a max bid, a status, a new max bid textbox 1122, a new status drop-down box 1124, a change campaign drop-down box 1126, and a delete keyword checkbox 1128.

The manage creative table 1140 may include carrier tabs 1170, a mobile site checkbox 1142, a listing title textbox 1144, a mobile site URL textbox 1146, a max bid textbox 1148, apply changes radio buttons 1158, a listing preview window 1152, a submit button 1154, and a defaults button 1156. The manage offer table 1160 may include a status drop-down box 1162, a max bid textbox 1164, an apply changes radio buttons 1166, and an update offer button 1168.

The listing summary table 1110 may display all of the listings of the campaign identified by the campaign drop-down box 1112. The campaign drop-down box may allow the revenue generator A 110A to choose one of the campaigns associated with the account identified in the account drop-down box 840. The account drop-down box 840 may include all of the accounts associated with the revenue generator A 110A. The summary listing table 1110 may contain a row of data for each listing of the campaign. The data may include the keyword associated with the listing, the max bid of the listing, and the status of the listing. The revenue generator may be able to enter a new max bid for the keyword in the new max bid textbox 1122. The status of the keyword maybe modified by changing the new status drop-down box 1124. The campaign the listing is associated with may be modified by the change campaign drop-down box 1126. The listing may be deleted by clicking on the delete checkbox 1128. The revenue generator A 110A may submit the changes by clicking on the update listings button 1130. The previous listings link 1132 and the next listings link 1134, may allow the revenue generator A 110A to view other listings associated with the selected campaign.

The revenue generator A 110A may be able to click on the keyword link 1120 to change the data related to the carrier listings of the keyword. When the revenue generator A 110A clicks on a keyword link 1120, the manage creative table 1140 and the manage offer table 1160 may update to reflect the data associated with the keyword link 1120 clicked on. The carrier listings data may be modified in the manage creative table 1140 and the manage offer table 1160. The manage creative table 1140 may allow the revenue generator A 110A to modify the advertisement associated with each carrier listing for the keyword. The revenue generator A 110A may be able to view data associated with each of the carrier listing by clicking through the carrier tabs 1170.

The manage creative table 1140 may display the keyword the revenue generator A 110A is currently viewing. The revenue generator A 110A may identify whether they have a mobile site for the carrier by clicking on the mobile site checkbox 1142. If the revenue generator A 110A has a mobile site for the carrier identified by the carrier tabs 1170, the revenue generator A 110A may enter the title of the advertisement in the listing title textbox 1144. The listing title may be the text of the advertisement that may be displayed to the users 120AA-NN. The revenue generator A 110A may enter the URL of their mobile site for the carrier in the mobile site URL textbox 1146. The mobile site URL may be the URL that the users 120AA-NN may be directed to upon clicking on the advertisement of the revenue generator A 110A. The revenue generator A 110A may identify their max bid for the keyword on the carrier in the max bid textbox 1148. The max bid may identify the maximum amount the revenue generator A 110A may be willing to pay to have their advertisement displayed to users 120AA-NN of the carrier. The apply changes radio buttons 1158 may allow the revenue generator A 110A to specify which carriers the changes may apply to. The revenue generator A 110A may submit the changes by clicking on the submit button 1154.

The revenue generator A 110A may click on the defaults button 1156 to fill the data fields in the manage creative table 1140 with any defaults they identified in the account preferences screenshot 900. A preview of the advertisement may be displayed in the listing preview window 1152. If the revenue generator A 110A makes changes to the manage creative table 1140, the revenue generator A 110A may need editorial approval. Editorial approval may require a supervisor or account administrator of the service provider 130 to approve of the creative changes to the listing for the given carrier. The editorial approval process may ensure that the advertisement does not contain hate terms, infringe on other trademarks, or otherwise be inappropriate for displaying to the users 120AA-NN. Alternatively or in addition the editorial approval may be automated and may be performed by the service provider 130.

The manage offer table 1160 may allow the revenue generator A 110A to modify a subset of the data associated with the carrier listing that does not require editorial approval. The revenue generator A 110A may change the status of the carrier listing by clicking on the status drop-down box 1162. The revenue generator A 110A may modify the bid amount in the max bid textbox 1164. The revenue generator A 110A may select which carriers the changes may apply to by using the apply changes radio buttons 1166. The revenue generator A 110A may update the manage offer table 1160 information by clicking on the update offer button 1168.

Alternatively or in addition the service provider 130 and/or the revenue generators 110A-N may use middleware to implement a presentation abstraction layer, such as the YAHOO! MOBILE SUSHI platform, to simplify the process of creating campaigns across multiple MNOs 115A-N.

Figure 12:
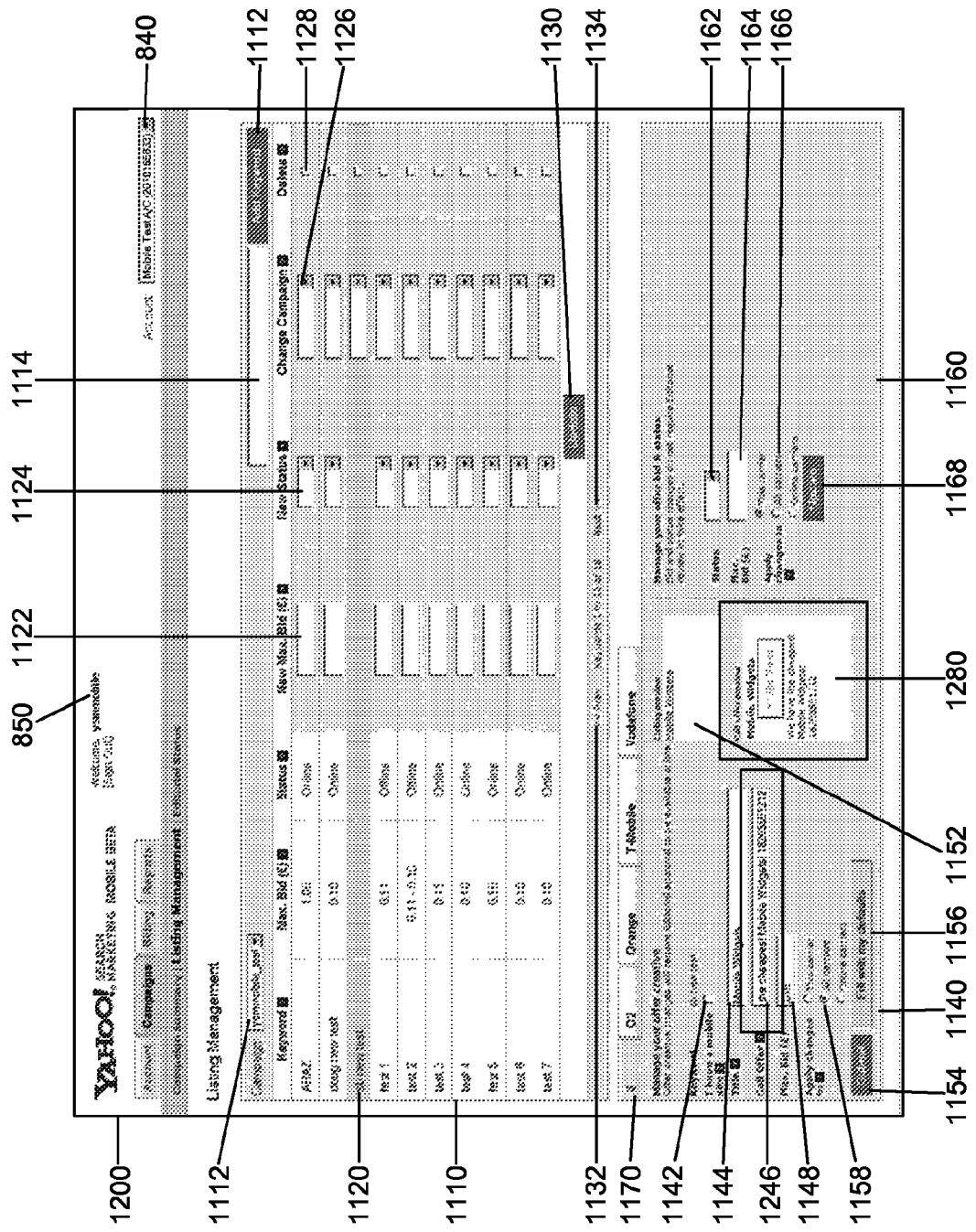
FIG. 12 is a screenshot of a revenue generator's listing management screen showing a call offer entry in the systems of FIG. 1, FIG. 2, and FIG. 3, or other systems for creating separate data serving spaces for each mobile carrier in a plurality of mobile carriers.

FIG. 12 is a screenshot 1200 of an implementation of a revenue generator listing management view of a revenue generator interface in the systems of FIG. 1, FIG. 2, and FIG. 3, or other systems for creating separate data serving spaces for each mobile carrier in a plurality of mobile carriers. The screenshot 1200 demonstrates the implementation of a "WAP ad" for revenue generators 110A-N who may not have mobile sites for a particular carrier. This functionality may be demonstrated in the manage creative table 1140. The remainder of the screenshot 1200 may be similar or the same as the screenshot 1100 in FIG. 11. A revenue generator interface may be displayed to one of the revenue generators 110A-N, such as the revenue generator A 110A, when the revenue generator A 110A interacts with the service provider 130.

In the screenshot 1200, the revenue generator A 110A may not have a mobile site for the mobile carrier "3". The revenue generator A 110A may uncheck the mobile site checkbox 1142 to identify that they do not have a mobile site for the mobile carrier. Unchecking the mobile site checkbox 1142 may cause the mobile site URL textbox 1146 in FIG. 11 to dynamically change into a call offer textbox 1246. In addition, a call offer preview window 1280 may be added to the manage creative table 1140. The revenue generator A 110A may enter the text of the "WAP ad" in the call offer textbox 1246. This text may be displayed to the users 120AA-NN when they click on the associated advertisement. The call offer preview window 1280 may display a preview of the call offer, or "WAP ad". The call offer may also include the logo identified in the call offer logo textbox 960 in FIG. 9.

Figure 13:
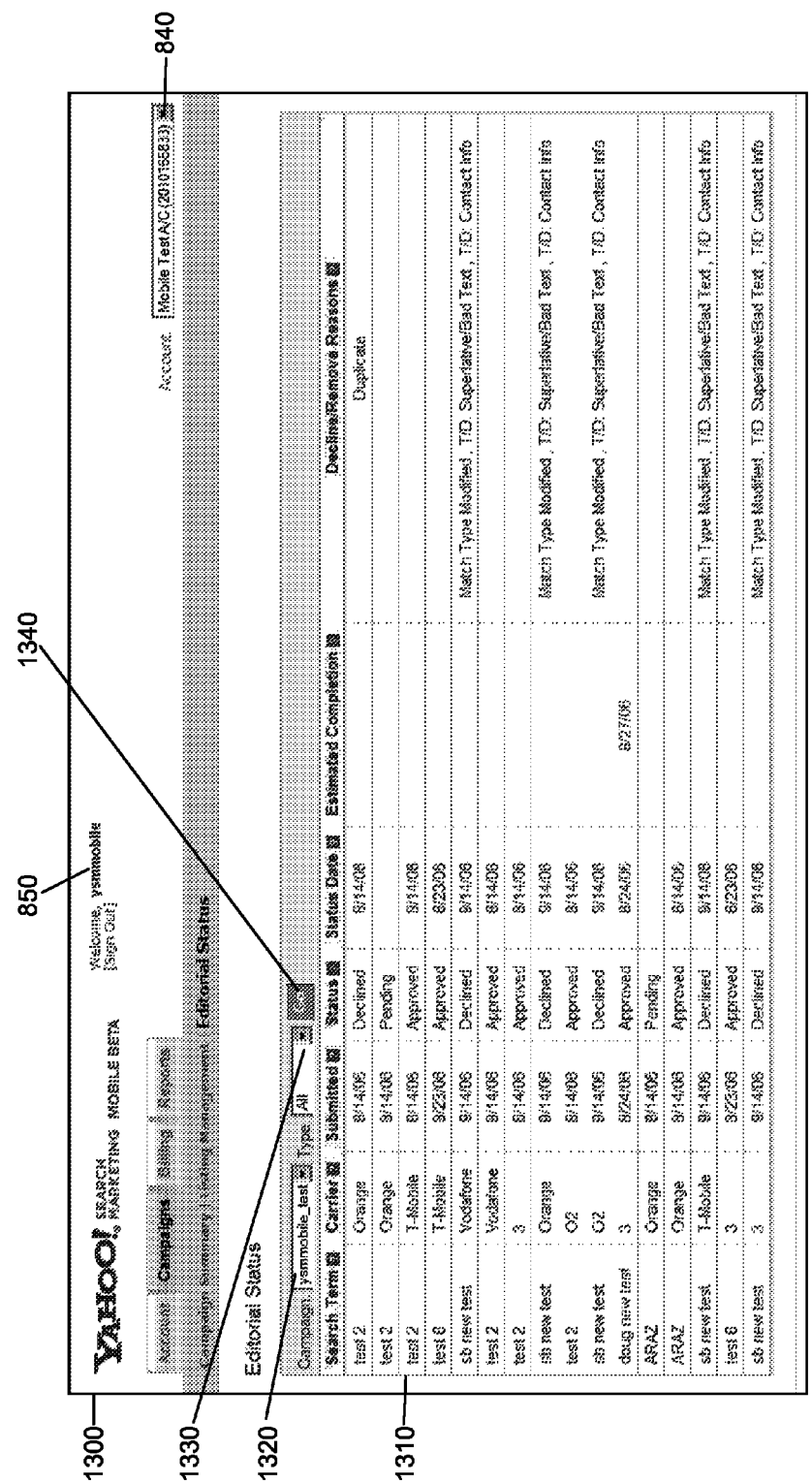
FIG. 13 is a screenshot of a revenue generator's listing management screen showing a mobile site URL entry in the systems of FIG. 1, FIG. 2, and FIG. 3, or other systems for creating separate data serving spaces for each mobile carrier in a plurality of mobile carriers.

FIG. 13 is a screenshot 1300 of an implementation of a revenue generator editorial status view of a revenue generator interface in the systems of FIG. 1, FIG. 2, and FIG. 3, or other systems for creating separate data serving spaces for each mobile carrier in a plurality of mobile carriers. A revenue generator interface may be displayed to one of the revenue generators 110A-N, such as the revenue generator A 110A, when the revenue generator A 110A interacts with the service provider 130. The editorial status screen may allow the revenue generator A 110A to view the editorial status of their listings. The screenshot 1300 may include an editorial status table 1310, a campaign drop-down box 1320, a type drop-down box 1330, a go button 1340, an account drop-down box 840, and a revenue generator identifier 850.

The editorial status table 1310 may display the editorial status of the listings associated with the campaign identified in the campaign status drop-down box 1320. The listing data may be further filtered by selecting a status type of the listing in the type drop-down box 1330, such as "All," "Declined," "Pending," or "Approved." The status type may refer to the status field in the editorial status table 1310. The revenue generator A 110A may submit changes to the campaign drop-down box 1320 or the type drop-down box 1330, by clicking on the go button 1340. Clicking on the go button 1340 may refresh the editorial status table 1310 with data filtered by the selected campaign and type. The editorial status table 1310 may include a row for each search term associated with the campaign. Each row may include information relating to the listing, such as the carrier, the date submitted, the editorial status, the status date, the estimated completion date, and the reasons for declining or removing the listing.

Figure 14:
FIG. 14 is a screenshot of a revenue generator's listings' editorial status in the systems of FIG. 1, FIG. 2, and FIG. 3, or other systems for creating separate data serving spaces for each mobile carrier in a plurality of mobile carriers.

FIG. 14 is a screenshot 1400 of an implementation of a revenue generator budgeting view of a revenue generator interface in the systems of FIG. 1, FIG. 2, and FIG. 3, or other systems for creating separate data serving spaces for each mobile carrier in a plurality of mobile carriers. A revenue generator interface may be displayed to one of the revenue generators 110A-N, such as the revenue generator A 110A, when the revenue generator A 110A interacts with the service provider 130. The budgeting view may allow the revenue generator A 110A to control the budgeting of their accounts across all carriers. The screenshot 1400 may include a budgeting table 1410, an enable budgeting checkbox 1412, an account budget amount 1414, a credit card drop-down box 1416, a replenish amount textbox 1418, a continue button 1420, an account drop-down box 840, and a revenue generator identifier 850.

The revenue generator may A 110A may click on the enable budgeting checkbox 1412 to enable daily budgeting functionality. Daily budgeting may allow the revenue generator A 110A to budget the amount spent for each account across all MNOs 115A-N. The revenue generator A 110A may enter a budget amount for the account in the account budget amount textbox 1414. The revenue generator A 110A may identify a credit card to pay with in the credit card drop-down box 1416. The revenue generator A 110A may identify a replenish amount in the replenish amount textbox 1418. The replenish amount may indicate the amount that the credit card of the revenue generator A 110A may be charged each time the account balance becomes low. The revenue generator A 110A may submit these changes to the service provider server 240 by clicking on the continue button 1420.

Figure 15:
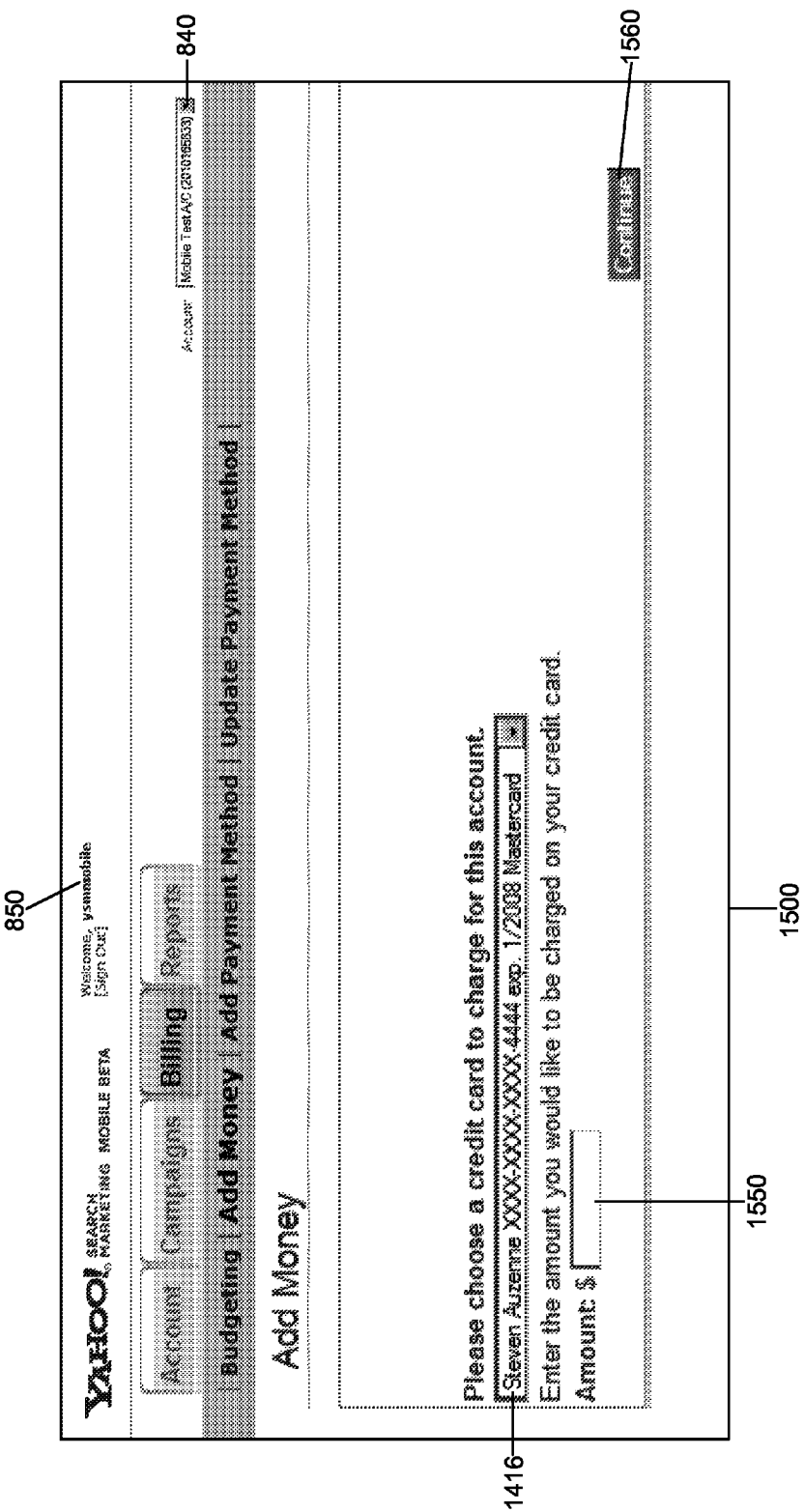
FIG. 15 is a screenshot of a revenue generator's budgeting screen in the systems of FIG. 1, FIG. 2, and FIG. 3, or other systems for creating separate data serving spaces for each mobile carrier in a plurality of mobile carriers.

FIG. 15 is a screenshot 1500 of an implementation of a revenue generator add money view of a revenue generator interface in the systems of FIG. 1, FIG. 2, and FIG. 3, or other systems for creating separate data serving spaces for each mobile carrier in a plurality of mobile carriers. A revenue generator interface may be displayed to one of the revenue generators 110A-N, such as the revenue generator A 110A, when the revenue generator A 110A interacts with the service provider 130. The add money view may allow the revenue generator A 110A to add money to an account. The screenshot 1500 may include a credit card drop-down box 1416, a charge amount textbox 1550, a continue button 1560, an account drop-down box 840, and a revenue generator identifier 850.

The revenue generator A 110A may enter an amount to add to an account in the amount textbox 1418. A credit card to charge the amount to may be selected from the credit card drop-down box 1416. The revenue generator A 110A may continue to the next screen by clicking on the continue button 1560. The revenue generator A 110A may use the money added to the account to place bids across any MNOs 115A-N associated with the account.

Figure 16:
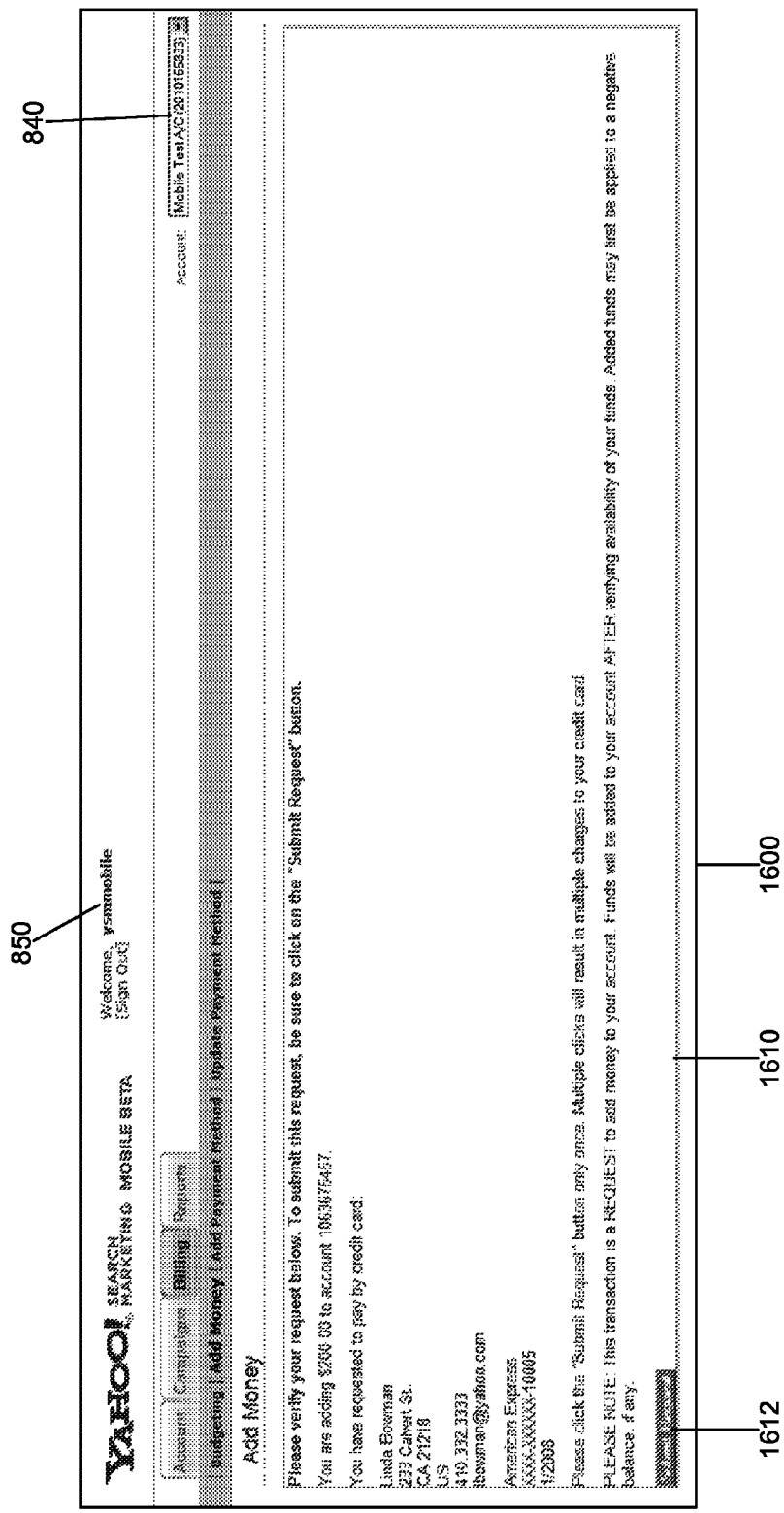
FIG. 16 is a screenshot of a revenue generator's add money screen in the systems of FIG. 1, FIG. 2, and FIG. 3, or other systems for creating separate data serving spaces for each mobile carrier in a plurality of mobile carriers.

FIG. 16 is a screenshot 1600 of an implementation of a revenue generator add money confirmation view of a revenue generator interface in the systems of FIG. 1, FIG. 2, and FIG. 3, or other systems for creating separate data serving spaces for each mobile carrier in a plurality of mobile carriers. A revenue generator interface may be displayed to one of the revenue generators 110A-N, such as the revenue generator A 110A, when the revenue generator A 110A interacts with the service provider 130. The add money confirmation view may show the revenue generator A 110A a summary of their add money request specified in FIG. 15. The revenue generator A 110A may reach the add money confirmation screenshot 1600 by clicking on the continue button 1560 in FIG. 15.

The screenshot 1600 may include a payment summary view 1610, an account drop-down box 840, and a revenue generator identifier 850. The payment summary view 1610 may include a submit request button 1612. The revenue generator may click on the submit request button 1612 to communicate their add money request to the service provider server 240. The revenue generator A 110A may use the added money to pay for advertising across all the MNOs 115A-N. The service provider 130 may utilize and independent cross-network payment mechanism to seamlessly handle payments to all of the MNOs 1115A-N.

Figure 17:
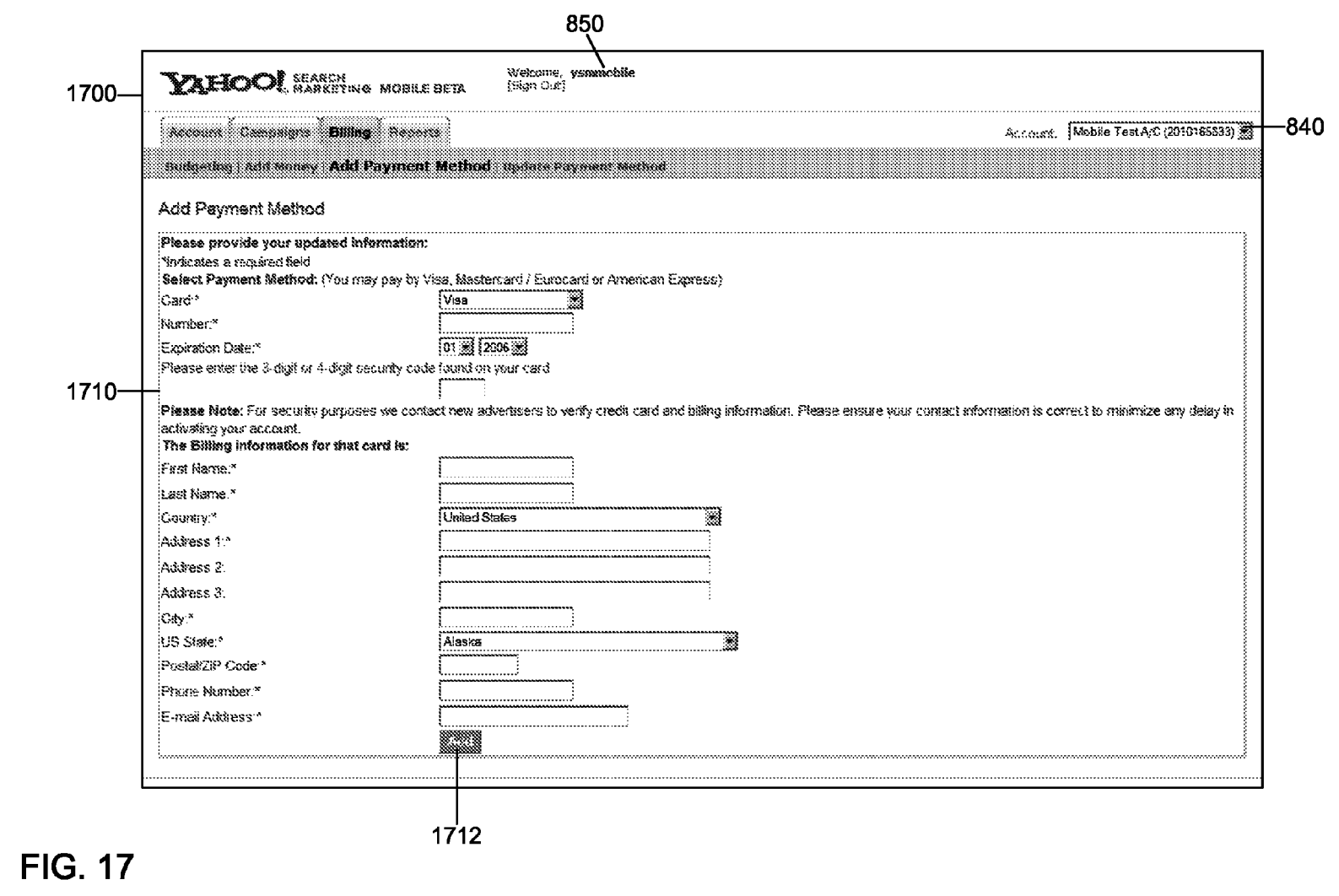

FIG. 17 is a screenshot 1700 of an implementation of a revenue generator add payment method screen of a revenue generator interface in the systems of FIG. 1, FIG. 2, and FIG. 3, or other systems for creating separate data serving spaces for each mobile carrier in a plurality of mobile carriers. A revenue generator interface may be displayed to one of the revenue generators 110A-N, such as the revenue generator A 110A, when the revenue generator A 110A interacts with the service provider 130. The screenshot 1700 may include an add payment method table 1710, an account drop-down box 840, and a revenue generator identifier 850. The add payment method screen may allow the revenue generator A 110A to add a payment method to the account identified in the account drop-down box 840.

The add payment method table 1710 may include an add button 1712 and several inputs relating to adding a payment method. The revenue generator A 110A may fill out the payment method/billing fields in the add payment method table 1710 with information relating to a new payment method. The revenue generator A 110A may click on the add button 1712 to communicate the add payment method request to the service provider server 240. The revenue generator A 110A may then use the added payment method to replenish the account specified in the account drop-down box 840.

Figure 18:
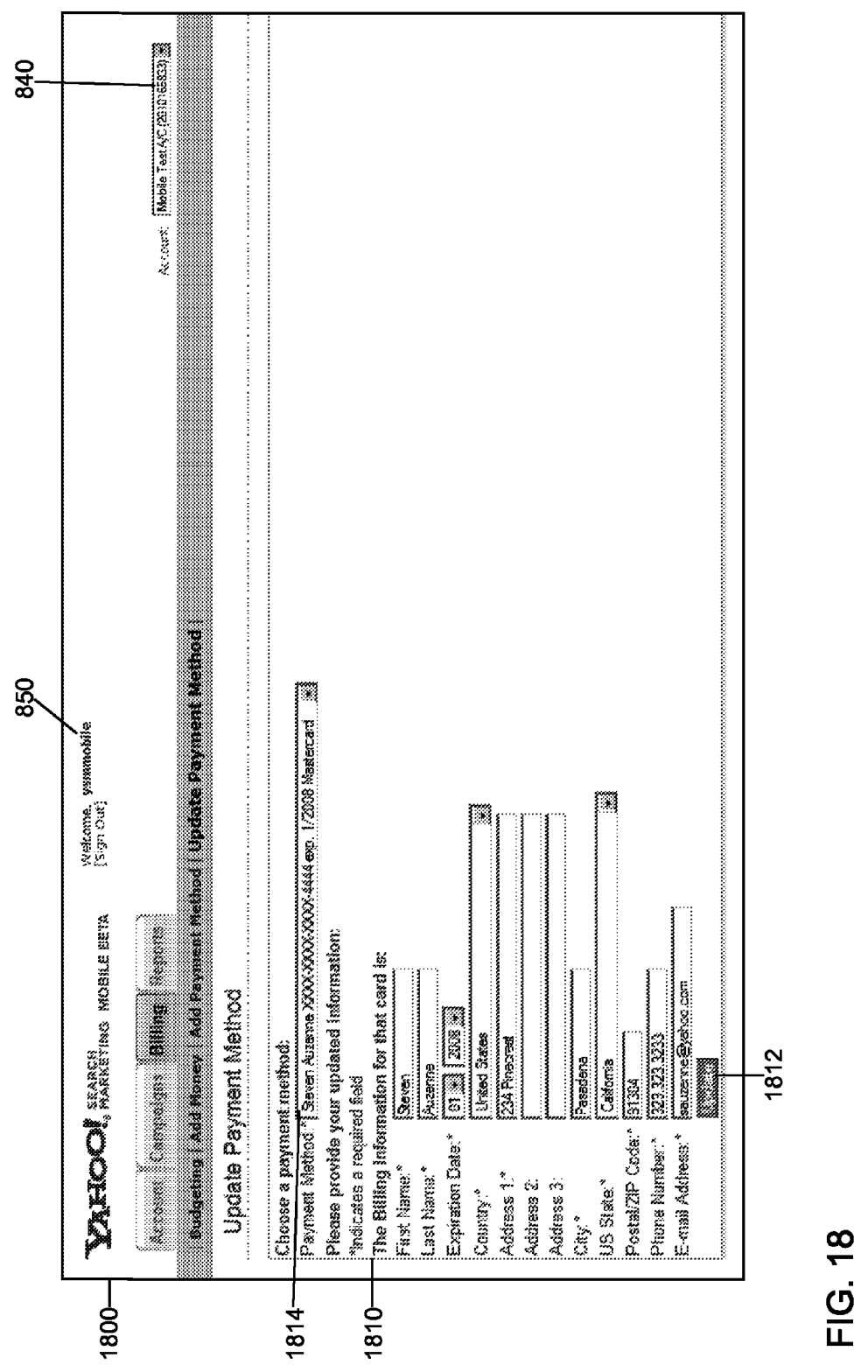

FIG. 18 is a screenshot 1800 of an implementation of a revenue generator update payment method screen of a revenue generator interface in the systems of FIG. 1, FIG. 2, and FIG. 3, or other systems for creating separate data serving spaces for each mobile carrier in a plurality of mobile carriers. A revenue generator interface may be displayed to one of the revenue generators 110A-N, such as the revenue generator A 110A, when the revenue generator A 110A interacts with the service provider 130. The screenshot 1700 may include an update payment method table 1810, an account drop-down box 840, and a revenue generator identifier 850. The update payment method screen may allow the revenue generator A 110A to update a payment method of the account identified in the account drop-down box 840.

The update payment method table 1810 may include an update button 1812, payment method drop-down box 1814, and several inputs relating to a payment method. The revenue generator A 110A may select a payment method to update by using the payment method drop-down box 1814. The payment method drop-down box 1814 may reflect the payment methods associated with the account identified in the account drop-down box 840. The revenue generator A 110A may modify the payment method/billing fields in the update payment method table 1810 with information relating to the payment method. The revenue generator A 110A may click on the update button 1812 to communicate the update payment method request to the service provider server 240. The revenue generator A 110A may then use the payment method to replenish the account specified in the account drop-down box 840.

Figure 19:
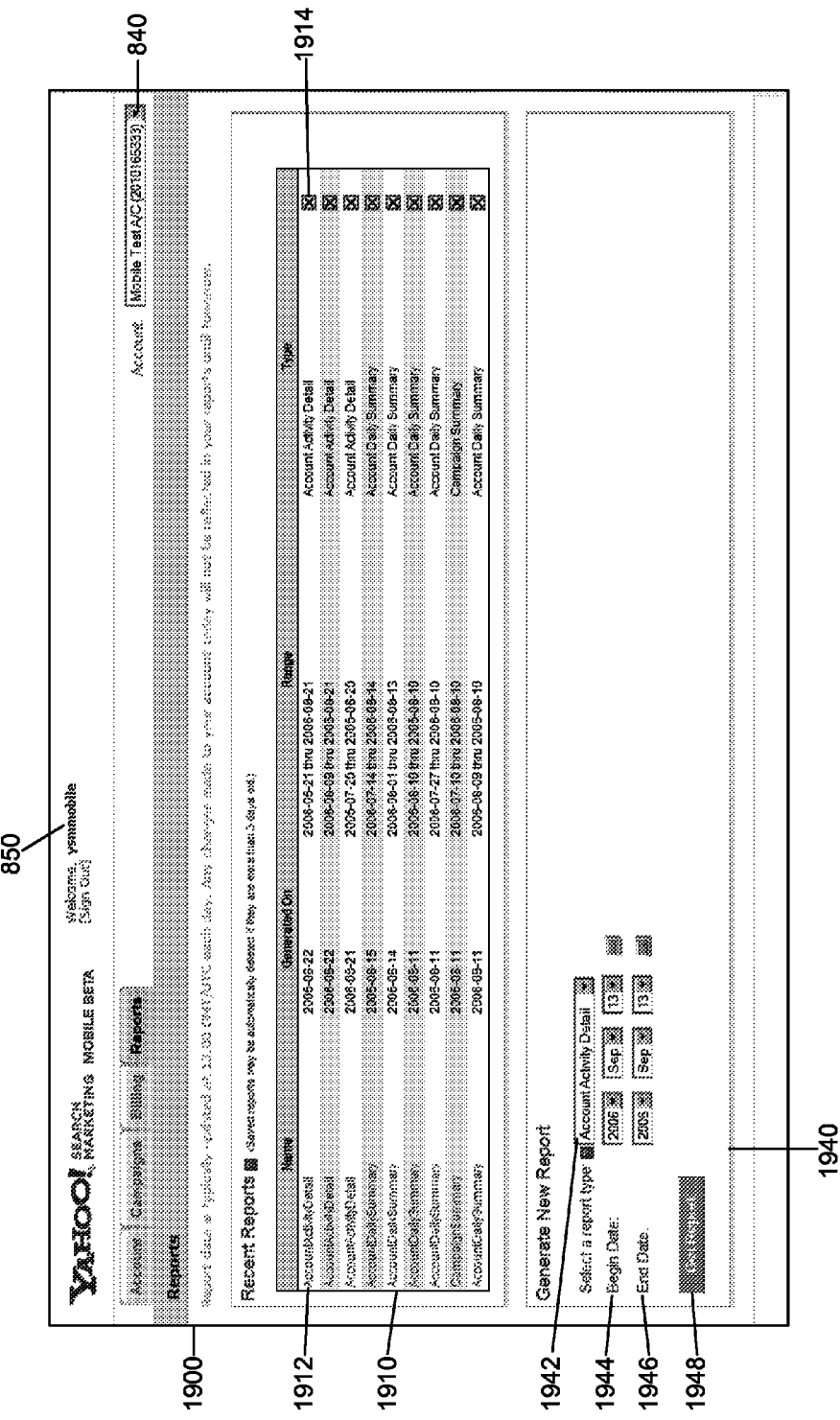
FIG. 19 is a screenshot of a revenue generator's update payment method in the systems of FIG. 1, FIG. 2, and FIG. 3, or other systems for creating separate data serving spaces for each mobile carrier in a plurality of mobile carriers.

FIG. 19 is a screenshot 1900 of an implementation of a revenue generator reports view of a revenue generator interface in the systems of FIG. 1, FIG. 2, and FIG. 3, or other systems for creating separate data serving spaces for each mobile carrier in a plurality of mobile carriers. A revenue generator interface may be displayed to one of the revenue generators 110A-N, such as the revenue generator A 110A, when the revenue generator A 110A interacts with the service provider 130. The screenshot 1900 may include a recent reports table 1910, a generate report table 1940, an account drop-down box 840, and a revenue generator identifier 850.

The recent reports table 1910 may include a report name link 1912 and a delete report box 1914. The recent reports table 1910 may display several rows of data relating to recently generated reports. The data may include the date the report was generated on, the date range the report relates to and the type of report. The revenue generator A 110A may be able to click on the report name link 1912 to view the report. The revenue generator A 110A may be able to click on the delete report box 1914 to delete the report.

The generate report table 1940 may include a report type drop-down box 1942, begin date drop-down boxes 1944, end date drop-down boxes 1946 and a get report button 1948. The report type drop-down box 1942 may allow the revenue generator A 110A to select a type of report to generate, such as an account activity detail report, an account daily summary report, and a campaign summary report. The begin date drop-down boxes 1944 may allow the revenue generator A 110A to select the date the beginning date of the report. The end date drop-down boxes 1946 may allow the revenue generator A 110A to specify an end date for the report. The revenue generator A 110A may click on the get report button 1948 to communicate the generate new report request to the service provider 240.

The reports screenshot 1900 may allow the revenue generator A 110A to monitor their listings across all the MNOs 115A-N. The revenue generator A 110A may be able to generate a report that displays the effectiveness of their listings across all MNOs 115A-N. The revenue generator A 110A may also be able to monitor and compare the effectiveness of their listings on each of the MNOs 115A-N.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A system comprising:
   memory to store a plurality of carrier listings, each respective carrier listing of the plurality of carrier listings being provided by a respective advertiser having an account on the system, each respective carrier listing including
   data identifying a mobile carrier network of a plurality of mobile carrier networks on which the respective carrier listing may be served to a user, each mobile carrier network of the plurality of mobile carrier networks providing data communication with a web browser of mobile devices in wireless communication with a data processing device of the each mobile carrier network, and
   a keyword to be matched with a search request received from a web browser of a mobile device in wireless communication with the identified mobile carrier network,
   so that a respective mobile advertising marketplace is established for each respective mobile network operator;
   an interface operative to communicate with respective mobile carrier networks of the plurality of mobile carrier networks including respective mobile devices in wireless communication with the respective mobile carrier networks;
   a processor in data communication with the memory and the interface, the processor operative to
   receive through the interface a keyword search request;
   identify a source of the received search request;
   if the received search request originated from a source other than a mobile device, process the received search request as a world wide web-originated request;
   if the received search request originated from a browser of an originating mobile device, identify a mobile carrier network of the plurality of mobile carrier networks with which the originating mobile device is in wireless communication and identify a mobile advertising marketplace established for the identified mobile carrier network;
   using the identity of the identified mobile carrier network and identity of the mobile advertising marketplace, select one or more carrier listings which include data identifying the identified mobile carrier network; and
   serve the selected one or more carrier listings to the identified mobile carrier network for communication to the web browser of the originating mobile device.

2. The system of claim 1 wherein the processor is further operative to format the selected one or more carrier listings for display by the web browser of the mobile device to enable advertisers to advertise on search traffic to the system from mobile carrier networks independent of whether the advertiser supports a page for display on the mobile carrier network.

3. The system of claim 2 wherein the processor is operative to format the selected one or more carrier listings using data defining technology supported by the mobile device.

4. The system of claim 3 wherein the processor is operative to select a number of carrier listings using data defining size of a display screen of the originating mobile device.

5. The system of claim 1 wherein each respective carrier listing comprises advertising creative and wherein the processor is further operative to format the selected one or more carrier listings for display by a display device of the originating mobile device, the processor adjusting the advertising creative of the selected one or more carrier listing when the display device of the originating mobile device has limited capability for displaying advertising creative.

6. The system of claim 1 wherein the processor is operative to identify an internet protocol (IP) address of the originating mobile device to identify the source of the received search request.

7. The system of claim 1 wherein the processor is operative to provide account summary view data to a data processing device of an advertiser for creation by the advertiser of separate data serving spaces for each mobile carrier network when the advertiser data processing device interacts with the system.

8. A method for an internet advertising service provider, the method comprising:

at a server of the internet advertising service provider, receiving search requests from a plurality of mobile carrier networks, each particular search request originating with a limited-capability web browser of an originating mobile device in wireless communication via Internet protocol with a respective mobile carrier network of the plurality of mobile carrier networks, the particular search request including data identifying the respective mobile carrier network;

in response to the received particular search request, providing search results to the identified mobile carrier network for communication to the originating mobile device, including selecting a plurality of search listings as the search results from a database of search listings using the data identifying the identified mobile carrier network, storing in the database of search listings data defining the plurality of search listings, each respective search listing originating with a respective advertiser seeking to provide the respective search listing only to a mobile device operating on a specified mobile carrier network of the plurality of mobile carrier networks exclusive of other mobile carrier networks of the plurality of mobile networks, the data for a respective search listing including data defining a search keyword to be matched with the search request and a carrier identifier field to identify the specified mobile carrier network of the plurality of mobile carrier networks to which the respective listing may be served to so that the advertiser can tailor provision of search listings of the advertiser to particular mobile carrier networks of the plurality of mobile carrier networks;

formatting the search results using the carrier identifier field and information about capability of the limited-capability web browser of the originating mobile device so that the advertiser does not have to accommodate the capability of the limited-capability web browser in search listings of the advertiser and so that the search results appear properly on the limited-capability browser; and serving the formatted search results to the identified mobile carrier network for communication to the originating mobile device.

9. The method of claim 8 wherein receiving search requests comprises receiving data defining the internet protocol address of the identified mobile carrier network.

10. The method of claim 8 wherein receiving search requests comprises receiving data defining the carrier identifier of the identified mobile carrier network.

11. The method claim 8 further comprising storing as the carrier identifier field a data prefix appended to the data defining the search keyword.

12. The method of claim 11 further comprising separating the data prefix from the data defining the search keyword with a predefined keyword separator to identification location in a character string where the data prefix ends and the data defining the search keyword begins.

\* \* \* \* \*